(12) United States Patent
Kawanishi

(10) Patent No.: US 11,485,810 B2
(45) Date of Patent: Nov. 1, 2022

(54) COPOLYMER AND COLORED RESIN COMPOSITION

(71) Applicant: SUMITOMO CHEMICAL COMPANY, LIMITED, Tokyo (JP)

(72) Inventor: Yutaka Kawanishi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/967,883

(22) PCT Filed: Feb. 19, 2019

(86) PCT No.: PCT/JP2019/005972
§ 371 (c)(1),
(2) Date: Aug. 6, 2020

(87) PCT Pub. No.: WO2019/163734
PCT Pub. Date: Aug. 29, 2019

(65) Prior Publication Data
US 2021/0047449 A1 Feb. 18, 2021

(30) Foreign Application Priority Data
Feb. 26, 2018 (JP) .............................. JP2018-032373

(51) Int. Cl.
| C08F 220/18 | (2006.01) |
| C09B 57/00 | (2006.01) |
| C09B 67/20 | (2006.01) |
| G02B 1/04 | (2006.01) |
| C08F 212/14 | (2006.01) |
| C08K 5/29 | (2006.01) |
| G02B 5/20 | (2006.01) |

(52) U.S. Cl.
CPC ...... *C08F 212/22* (2020.02); *C08F 220/1806* (2020.02); *C08K 5/29* (2013.01); *C09B 57/007* (2013.01); *C09B 67/0063* (2013.01); *G02B 1/04* (2013.01); C08F 2800/20 (2013.01); G02B 5/20 (2013.01)

(58) Field of Classification Search
CPC .. C08F 220/1806; C08F 2800/20; C08K 5/29; C09B 57/007; C09B 67/0063; G02B 1/04; G02B 5/20
See application file for complete search history.

(56) References Cited

U.S. PATENT DOCUMENTS

2017/0123120 A1* 5/2017 Shirouchi .............. G02B 5/201

FOREIGN PATENT DOCUMENTS

| CN | 106104371 A | 11/2016 | |
| JP | 2001-343743 A | 12/2001 | |
| JP | 2001343743 A | * 12/2001 | .............. C08K 5/28 |
| JP | 2008-250191 A | 10/2008 | |
| JP | 2011-158501 A | 8/2011 | |
| JP | 2011158501 A | * 8/2011 | .............. C08F 2/44 |
| JP | 2015-086379 A | 5/2015 | |
| JP | 2015194719 A | * 11/2015 | ............ C08F 212/08 |
| JP | 2016-133575 A | 7/2016 | |
| JP | 2016133575 A | * 7/2016 | ............ C08F 212/08 |
| WO | WO-2015/147312 A1 | 10/2015 | |

OTHER PUBLICATIONS

International Searching Authority, "International Search Report," issued in connection with International Patent Application No. PCT/JP2019/005972, dated May 21, 2019.

International Searching Authority, "Written Opinion," issued in connection with International Patent Application No. PCT/JP2019/005972, dated May 21, 2019.

Office Action dated Oct. 11, 2021 issued in a corresponding Chinese Patent Application No. 201980014495.4, (16 pages).

* cited by examiner

*Primary Examiner* — Bijan Ahvazi
(74) *Attorney, Agent, or Firm* — Foley & Lardner LLP

(57) ABSTRACT

A copolymer useful as an ingredient of a colored resin composition, comprising a structural unit derived from an aromatic carboxylic acid having an ethylenically unsaturated bond, a structural unit (Ab) represented by formula (Z), and a structural unit (Ac) derived from an unsaturated compound having a cyclic ether structure having 2 to 4 carbon atoms, wherein L represents a single bond or a divalent linking group, A represents a phenyl group optionally having a substituent other than a carboxy group or a naphthyl group optionally having a substituent other than a carboxy group, $R^a$ represents a hydrogen atom, or an alkyl group having 1 to 4 carbon atoms, and a hydrogen atom contained in the alkyl group is optionally replaced by a hydroxy group.

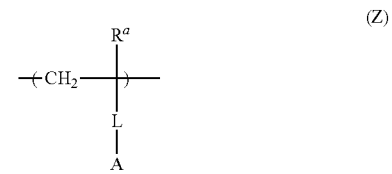

(Z)

6 Claims, No Drawings

COPOLYMER AND COLORED RESIN COMPOSITION

CROSS-REFERENCE TO RELATED APPLICATIONS

The present application claims priority under 37 U.S.C. § 371 to International Patent Application No. PCT/JP2019/005972, filed Feb. 19, 2019, which claims priority to and the benefit of Japanese Patent Application No. 2018-032373, filed on Feb. 26, 2018. The contents of these applications are hereby incorporated by reference in their entireties.

TECHNICAL FIELD

The present invention relates to a copolymer, and a colored resin composition containing the copolymer, and also relates to a color filter formed of the colored resin composition.

BACKGROUND ART

Various dyes are known as colorants contained in colored resin compositions which form color filters contained in liquid crystal display devices and solid-state image sensors. Patent Literature 1 discloses a colored resin composition containing a squarylium dye.

CITATION LIST

Patent Literature

Patent Literature 1: Japanese Patent Laid-Open No. 2015-86379

SUMMARY OF INVENTION

Technical Problem

An object of the present invention is to provide a color filter superior in solvent resistance to color filters formed of conventional colored resin compositions, a colored resin composition capable of forming the color filter, and a copolymer which is contained in the colored resin composition.

Solution to Problem

The present invention provides the following [1] to [6].

[1] A copolymer comprising a structural unit (Aa) derived from an aromatic carboxylic acid having an ethylenically unsaturated bond, a structural unit (Ab) represented by formula (Z), and a structural unit (Ac) derived from an unsaturated compound having a cyclic ether structure having 2 to 4 carbon atoms:

[Formula 1]

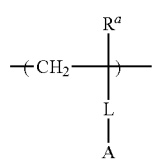

(Z)

wherein L represents a single bond or a divalent linking group, A represents a phenyl group optionally having a substituent other than a carboxy group or a naphthyl group optionally having a substituent other than a carboxy group, $R^a$ represents a hydrogen atom, or an alkyl group having 1 to 4 carbon atoms, and a hydrogen atom contained in the alkyl group is optionally replaced by a hydroxy group.

[2] The copolymer according to [1], wherein the total content percentage of the structural unit (Aa) and the structural unit (Ab) is 40 mol % or more and 90 mol % or less based on the total amount of all structural units.

[3] A colored resin composition comprising the copolymer according to [1] or [2], and a colorant.

[4] The colored resin composition according to [3], wherein the colorant comprises a first dye, and the first dye is a squarylium dye.

[5] A cured film formed of the colored resin composition according to [3] or [4].

[6] A color filter formed of the colored resin composition according to [3] or [4].

Advantageous Effect of Invention

The copolymer of the present invention is capable of forming a color filter excellent in solvent resistance.

DESCRIPTION OF EMBODIMENTS

[Copolymer]

A copolymer (A) of the present invention contains a structural unit (Aa) derived from an aromatic carboxylic acid having an ethylenically unsaturated bond, a structural unit (Ab) represented by formula (Z), and a structural unit (Ac) derived from an unsaturated compound having a cyclic ether structure having 2 to 4 carbon atoms.

[Formula 2]

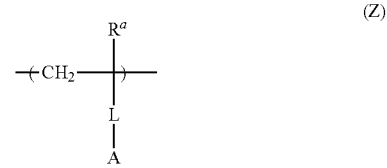

(Z)

wherein L represents a single bond or a divalent linking group, A represents a phenyl group optionally having a substituent other than a carboxy group or a naphthyl group optionally having a substituent other than a carboxy group, $R^a$ represents a hydrogen atom, or an alkyl group having 1 to 4 carbon atoms, and a hydrogen atom contained in the alkyl group is optionally replaced by a hydroxy group.

The copolymer (A) of the present invention may further contain a structural unit other than the structural unit (Aa), the structural unit (Ab) and the structural unit (Ac) (hereinafter, also referred to as a "structural unit (Ad)").

<Structural Unit (Aa)>

The structural unit (Aa) derived from an aromatic carboxylic acid having an ethylenically unsaturated bond is a structural unit derived from at least one compound selected from the group consisting of an aromatic carboxylic acid having an ethylenically unsaturated bond and an aromatic carboxylic acid anhydride having an ethylenically unsaturated bond (hereinafter, also referred to a "compound (Aa)"). The structural unit (Aa) can be obtained by synthesizing a copolymer using the compound (Aa) as a monomer. Alternatively, the structural unit (Aa) can be obtained by reacting another structural unit (Aa') with a compound (Aa") having an aromatic carboxylic acid.

Specific examples of the compound (Aa) include aromatic carboxylic acids such as o-vinylbenzoic acid, m-vinylbenzoic acid, p-vinylbenzoic acid, 3-vinylphthalic acid and 4-vinylphthalic acid; and aromatic carboxylic acid anhydrides such as 3-vinylphthalic acid anhydride and 4-vinylphthalic acid anhydride.

<Structural Unit (Ab)>

The structural unit (Ab) represented by formula (Z) can be obtained by performing polymerization using a compound represented by formula (Z') (hereinafter, also referred to as a "compound (Ab)") as a monomer. Alternatively, the structural unit (Ab) can be obtained by reacting another structural unit (Ab') with a compound (Ab") having a -L-A moiety.

[Formula 3]

(Z')

In formula (Z'), L, A and $R^a$ are the same as in formula (Z).

L in formula (Z) and formula (Z') represents a single bond or a divalent linking group, examples of the divalent linking group include divalent hydrocarbon groups having 1 to 20 carbon atoms, and —$CH_2$— in the hydrocarbon group is optionally replaced by —COO—, —O—, —CO—, —NH—, —NHCO—, —CONH—, —NHCOO— or —OCONH—. The divalent linking group is preferably —$CH_2$—, —COO—, —O—, —NHCO—, —CONH—, —NHCOO— or —OCONH—.

A in formula (Z) and formula (Z') represents a phenyl group or a naphthyl group optionally having a substituent other than a carboxy group. Examples of the substituent optionally present in A include a hydroxy group, alkyl groups having 1 to 12 carbon atoms, alkoxy groups having 1 to 12 carbon atoms, a phenyl group optionally having a substituent, cycloaliphatic hydrocarbon groups having 3 to 12 carbon atoms, and combinations of any of these groups.

Examples of the alkyl group having 1 to 12 carbon atoms include a methyl group, an ethyl group, a propyl group, a butyl group, a pentyl group, a hexyl group, a heptyl group, an octyl group, a nonyl group, a decyl group, an undecyl group and a dodecyl group.

Examples of the alkoxy group having 1 to 12 carbon atoms include a methoxy group, an ethoxy group, a propoxy group, a butoxy group, a pentyloxy group, a hexyloxy group, an octyloxy group, a 2-ethylhexyloxy group, a nonyloxy group, a decyloxy group, an undecyloxy group and a dodecyloxy group.

Examples of the cycloaliphatic hydrocarbon group having 3 to 12 carbon atoms include the groups shown below. * represents a point of attachment to the ring.

[Formula 4]

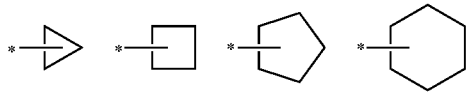

-continued

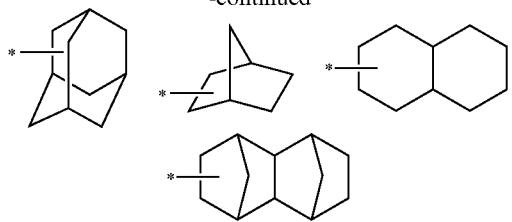

The substituent is preferably a hydroxy group, an alkyl group having 1 to 12 carbon atoms, or an alkoxy group having 1 to 12 carbon atoms, more preferably a hydroxy group or an alkyl group having 1 to 12 carbon atoms, still more preferably an alkyl group having 1 to 12 carbon atoms, furthermore preferably an alkyl group having 1 to 6 carbon atoms, among the above-mentioned substituents.

$R^a$ in formula (Z) and formula (Z') represents a hydrogen atom, or an alkyl group having 1 to 4 carbon atoms, and a hydrogen atom contained in the alkyl group is optionally replaced by a hydroxy group.

Examples of the alkyl group having 1 to 4 carbon atoms include a methyl group, an ethyl group, a n-propyl group, an isopropyl group, a n-butyl group, a sec-butyl group and a tert-butyl group.

Examples of the alkyl group with a hydrogen atom replaced by hydroxy include a hydroxymethyl group, a 1-hydroxyethyl group, a 2-hydroxyethyl group, a 1-hydroxypropyl group, a 2-hydroxypropyl group, a 3-hydroxypropyl group, a 1-hydroxy-1-methylethyl group, a 2-hydroxy-1-methylethyl group, a 1-hydroxybutyl group, a 2-hydroxybutyl group, a 3-hydroxybutyl group and a 4-hydroxybutyl group.

$R^a$ is preferably a hydrogen atom, a methyl group, a hydroxymethyl group, a 1-hydroxyethyl group or a 2-hydroxyethyl group, more preferably a hydrogen atom or a methyl group.

Examples of the compound represented by formula (Z') include compounds of the following formula (Z-1), formula (Z-2), formula (Z-3), formula (Z-4), formula (Z-5) and formula (Z-6).

[Formula 5]

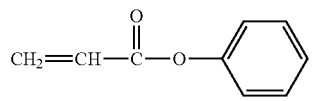

(Z-1)

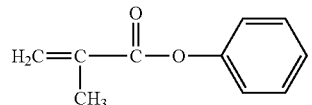

(Z-2)

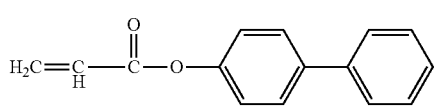

(Z-3)

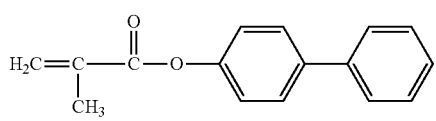

(Z-4)

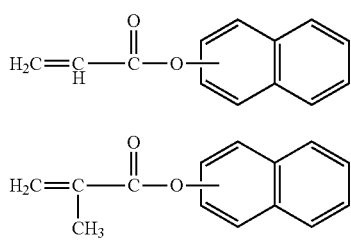

(Z-5)

(Z-6)

<Structural Unit (Ac)>

The structural unit (Ac) derived from an unsaturated compound having a cyclic ether structure having 2 to 4 carbon atoms can be obtained by synthesizing a copolymer using as a monomer an unsaturated compound having a cyclic ether structure having 2 to 4 carbon atoms (hereinafter, also referred to as a "compound (Ac)"). Alternatively, the structural unit (Ac) can be obtained by reacting another structural unit (Ac') with a compound having a cyclic ether structure having 2 to 4 carbon atoms (Ac").

The compound (Ac) is an unsaturated compound having a cyclic ether structure having 2 to 4 carbon atoms (for example, at least one selected from the group consisting of an oxirane ring, an oxetane ring and a tetrahydrofuran ring). The compound (Ac) is, for example, a compound having an oxiranyl group and an ethylenically unsaturated bond (Ac1), a compound having an oxetanyl group and an ethylenically unsaturated bond (Ac2), or a compound having a tetrahydrofuryl group and an ethylenically unsaturated bond (Ac3).

The compound (Ac1) is, for example, a compound having a structure in which a linear or branched unsaturated aliphatic hydrocarbon is epoxidized (Ac1-1), or a compound having a structure in which an unsaturated cycloaliphatic hydrocarbon is epoxidized (Ac1-2). As a compound from which the structural unit (Ac) is derived, the compound (Ac1) is preferable because reliability of heat resistance, chemical resistance and the like of the resulting film can be further enhanced. The monomer (Ac1-2) is more preferable because a copolymer excellent in storage stability is obtained.

Examples of the compound (Ac1-1) include glycidyl (meth)acrylate, β-methylglycidyl (meth)acrylate, ρ-ethylglycidyl (meth)acrylate, glycidylvinyl ether, o-vinylbenzylglycidyl ether, m-vinylbenzylglycidyl ether, p-vinylbenzylglycidyl ether, α-methyl-o-vinylbenzylglycidyl ether, α-methyl-m-vinylbenzylglycidyl ether, α-methyl-p-vinylbenzylglycidyl ether, 2,3-bis(glycidyloxymethyl)styrene, 2,4-bis(glycidyloxymethyl)styrene, 2,5-bis(glycidyloxymethyl)styrene, 2,6-bis(glycidyloxymethyl)styrene, 2,3,4-tris(glycidyloxymethyl)styrene, 2,3,5-tris(glycidyloxymethyl)styrene, 2,3,6-tris(glycidyloxymethyl)styrene, 3,4,5-tris(glycidyloxymethyl)styrene and 2,4,6-tris(glycidyloxymethyl)styrene.

Examples of the compound (Ac1-2) include vinylcyclohexene monoxide, 1,2-epoxy-4-vinylcyclohexane (for example, CELLOXIDE 2000; manufactured by Daicel Corporation), 3,4-epoxycyclohexylmethyl (meth)acrylate (for example, CYCLOMER A400; manufactured by Daicel Corporation), 3,4-epoxycyclohexylmethyl (meth)acrylate (for example, CYCLOMER M100; manufactured by Daicel Corporation), compounds represented by formula (I), and compounds represented by formula (II).

[Formula 6]

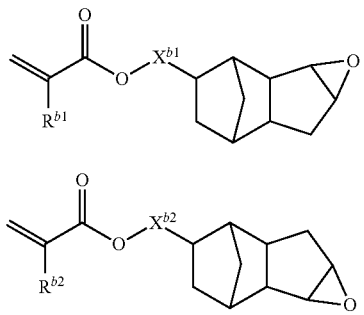

wherein $R^{b1}$ and $R^{b2}$ each represent a hydrogen atom or an alkyl group having 1 to 4 carbon atoms, and a hydrogen atom contained in the alkyl group is optionally replaced by a hydroxy group.

$X^{b1}$ and $X^{b2}$ each represent a single bond, *—$R^{b3}$—, *—$R^{b3}$—O—, *—$R^{b3}$—S— or *—$R^{b3}$—NH—.

$R^{b3}$ represents an alkanediyl group having 1 to 6 carbon atoms.

* represents a point of attachment to O.

Examples of the alkyl group having 1 to 4 carbon atoms include a methyl group, an ethyl group, a n-propyl group, an isopropyl group, a n-butyl group, a sec-butyl group and a tert-butyl group.

Examples of the alkyl group with a hydrogen atom replaced by a hydroxy group include a hydroxymethyl group, a 1-hydroxyethyl group, a 2-hydroxyethyl group, a 1-hydroxypropyl group, a 2-hydroxypropyl group, a 3-hydroxypropyl group, a 1-hydroxy-1-methylethyl group, a 2-hydroxy-1-methylethyl group, a 1-hydroxybutyl group, a 2-hydroxybutyl group, a 3-hydroxybutyl group and a 4-hydroxybutyl group.

$R^{b1}$ and $R^{b2}$ are each preferably a hydrogen atom, a methyl group, a hydroxymethyl group, a 1-hydroxyethyl group or a 2-hydroxyethyl group, more preferably a hydrogen atom or a methyl group.

Examples of the alkanediyl group include a methylene group, an ethylene group, a propane-1,2-diyl, a propane-1,3-diyl group, a butane-1,4-diyl group, a pantane-1,5-diyl group and a hexane-1,6-diyl group.

$X^{b1}$ and $X^{b2}$ are each preferably a single bond, a methylene group, an ethylene group, *—$CH_2$—O— or *—$CH_2CH_2$—O—, more preferably a single bond or *—$CH_2CH_2$—O—. * represents a point of attachment to O.

The compound represented by formula (I) is a compound represented by any one of formula (I-1) to formula (I-15), or the like, preferably a compound represented by any one of formula (I-1), formula (I-3), formula (I-5), formula (I-7), formula (I-9) and formula (I-11) to formula (I-15), more preferably a compound represented by formula (I-1), formula (I-7), formula (I-9) or formula (I-15).

[Formula 7]

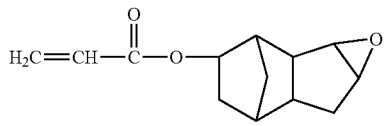

(I-1)

(I-2)
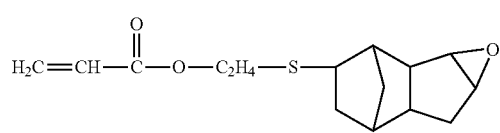

(I-3)
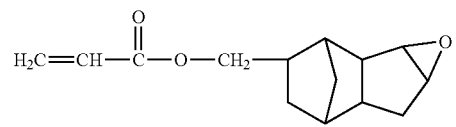

(I-4)
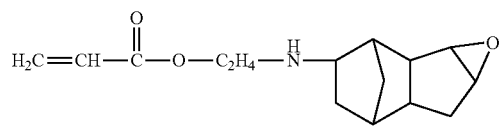

(I-5)
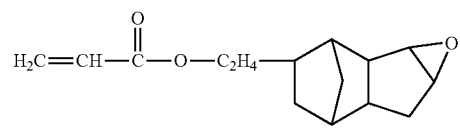

(I-6)
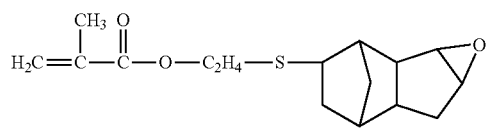

(I-7)
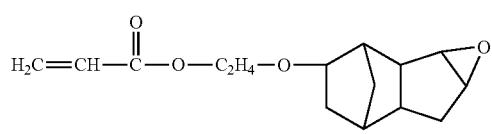

(I-8)
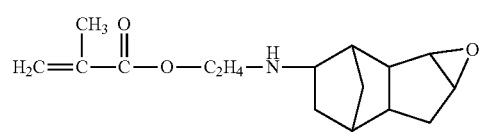

[Formula 8]

(I-9)
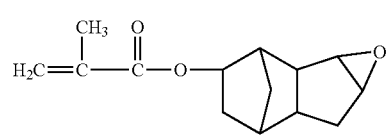

(I-10)
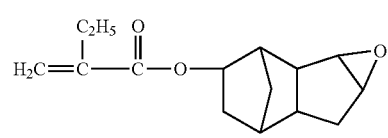

(I-11)
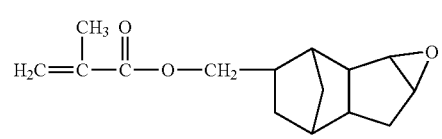

(I-12)
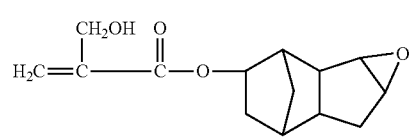

(I-13)
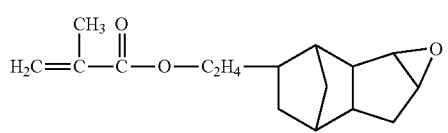

(I-14)
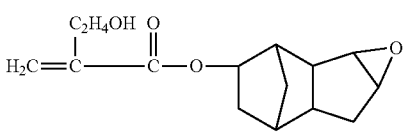

(I-15)
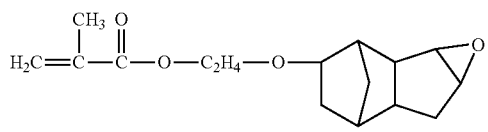

The compound represented by formula (II) is a compound represented by any one of formula (II-1) to formula (II-15), or the like, preferably a compound represented by any one of formula (II-1), formula (II-3), formula (II-5), formula (II-7), formula (II-9) and formula (II-11) to formula (II-15), more preferably a compound represented by formula (II-1), formula (II-7), formula (II-9) or formula (II-15).

[Formula 9]

(II-1)
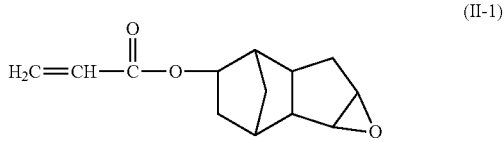

(II-2)
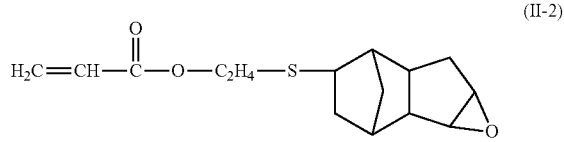

(II-3)
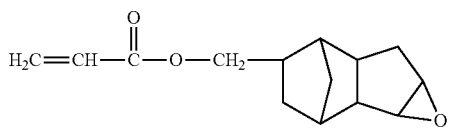

(II-4)
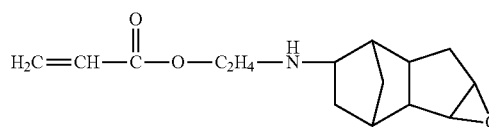

(II-5)
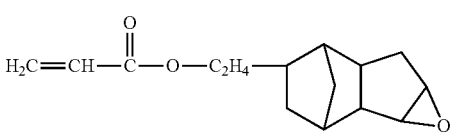

(II-6)
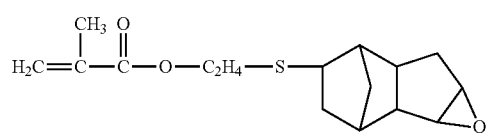

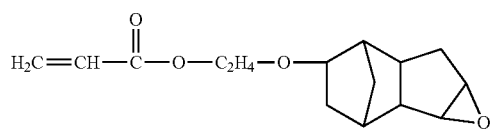 (II-7)

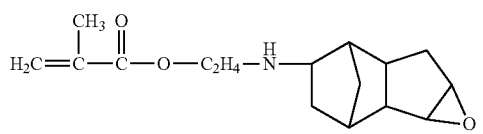 (II-8)

[Formula 10]

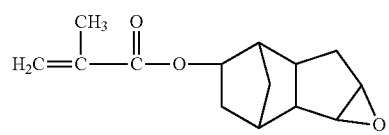 (II-9)

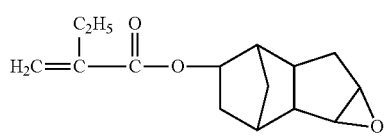 (II-10)

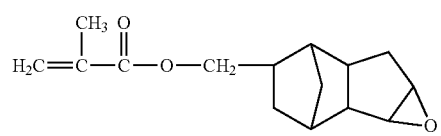 (II-11)

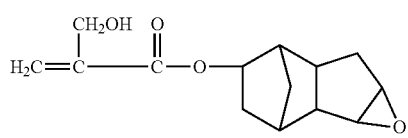 (II-12)

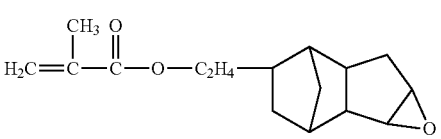 (II-13)

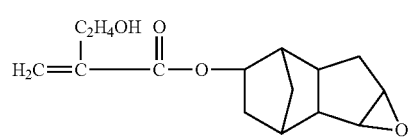 (II-14)

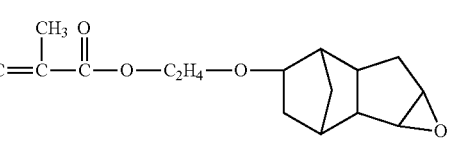 (II-15)

The compounds represented by formula (I) and the compounds represented by formula (II) may be used singly or in combinations of two or more thereof. When the compounds are used in combination, the content ratio of compounds represented by formula (I) to compounds represented by formula (II) is preferably 5:95 to 95: 5, more preferably 20:80 to 80 to 20, on molar basis. For example, a mixture containing the compound represented by formula (I-1) and the compound represented by formula (II-1) at a ratio of 50:50.

The compound (Ac2) is more preferably a compound having an oxetanyl group and a (meth)acryloyloxy. Examples of the compound (Ac2) include 3-methyl-3-methacryloyloxymethyloxetane, 3-methyl-3-acryloyloxymethyl- oxetane, 3-ethyl-3-methacryloyloxymethyloxetane, 3-ethyl-3-acryloyloxymethyloxetane, 3-methyl-3-methacryloyloxyethyloxetane, 3-methyl-3-acryloyloxyethyloxetane, 3-ethyl-3-methacryloyloxyethyloxetane and 3-ethyl-3-acryloyloxyethyloxetane.

The compound (Ac3) is preferably a compound having a tetrahydrofuryl group and a (meth)acryloyloxy group. Examples of the compound (Ac3) include tetrahydrofurfuryl acrylate (for example, VISCOAT V #150, manufactured by OSAKA ORGANIC CHEMICAL INDUSTRY LTD.) and tetrahydrofurfuryl methacrylate.

The structural unit (Ac) is preferably a structural unit represented by formula (Ac-1) or (Ac-2) because a copolymer excellent in storage stability is obtained, and the resulting film is excellent in chemical resistance, heat resistance and mechanical resistance. The structural unit represented by formula (Ac-1) is derived from a compound represented by formula (I), and the structural unit represented by formula (Ac-2) is derived from a compound represented by formula (II).

[Formula 11]

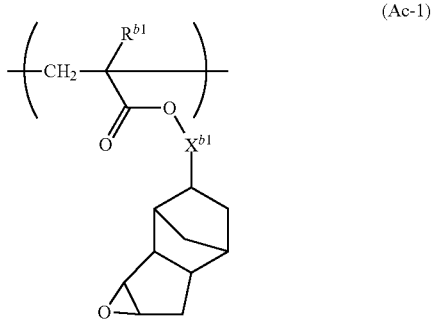 (Ac-1)

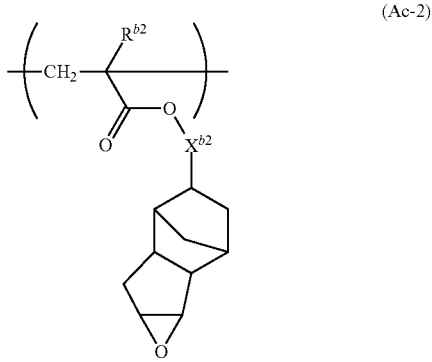 (Ac-2)

In formula (Ac-1) and formula (Ac-2), $R^{b1}$ and $R^{b2}$ each represent a hydrogen atom or an alkyl group having 1 to 4 carbon atoms, and a hydrogen atom contained in the alkyl group is optionally replaced by a hydroxy group.

$X^{b1}$ and $X^{b2}$ each represent a single bond, *—$R^{b3}$—, *—$R^{b3}$—O—, *—$R^{b3}$—S— or *—$R^{b3}$—NH—.

$R^{b3}$ represents an alkanediyl group having 1 to 6 carbon atoms.

* represents a point of attachment to O.]

<Structural Unit (Ad)>

Examples of the structural unit (Ad) include structural units which can be obtained by synthesizing a polymer using a compound (Ad) as a monomer.

Examples of the compound (Ad) include (meth)acrylic acid esters such as methyl (meth)acrylate, ethyl (meth)

acrylate, n-butyl (meth)acrylate, sec-butyl (meth) acrylate, tert-butyl (meth) acrylate, 2-ethylhexyl (meth)acrylate, dodecyl (meth)acrylate, lauryl (meth) acrylate, stearyl (meth) acrylate, cyclopentyl (meth)acrylate, cyclohexyl (meth)acrylate, 2-methylcyclohexyl (meth) acrylate, tricyclo[5.2.1.0$^{2,6}$]decan-8-yl (meth)acrylate (referred to as "dicyclopentanyl (meth)acrylate" as a trivial name in the art; sometimes referred to as "tricyclodecyl (meth)acrylate"), tricyclo[5.2.1.0$^{2,6}$]decen-8-yl (meth)acrylate (referred to as "dicyclopentenyl (meth)acrylate" as a trivial name in the art), dicyclopentanyloxyethyl (meth) acrylate, isobornyl (meth)acrylate, adamantyl (meth)acrylate, allyl (meth)acrylate and propargyl (meth)acrylate; hydroxy group-containing (meth)acrylic acid esters such as 2-hydroxyethyl (meth) acrylate and 2-hydroxypropyl (meth)acrylate; dicarboxylic acid diesters such as diethyl maleate, diethyl fumarate and diethyl itaconate; bicyclo unsaturated compounds such as bicyclo[2.2.1]hept-2-ene, 5-methylbicyclo[2.2.1]hept-2-ene, 5-ethylbicyclo[2.2.1]hept-2-ene, 5-hydroxybicyclo[2.2.1]hept-2-ene, 5-hydroxymethylbicyclo[2.2.1]hept-2-ene, 5-(2'-hydroxyethyl)bicyclo[2.2.1]hept-2-ene, 5-methoxybicyclo[2.2.1]hept-2-ene, 5-ethoxybicyclo[2.2.1]hept-2-ene, 5,6-dihydroxybicyclo[2.2.1]hept-2-ene, 5,6-di(hydroxymethyl)bicyclo[2.2.1]hept-2-ene, 5,6-di(2'-hydroxyethyl)bicyclo[2.2.1]hept-2-ene, 5,6-dimethoxybicyclo[2.2.1]hept-2-ene, 5,6-diethoxybicyclo[2.2.1]hept-2-ene, 5-hydroxy-5-methylbicyclo[2.2.1]hept-2-ene, 5-hydroxy-5-ethylbicyclo[2.2.1]hept-2-ene, 5-hydroxymethyl-5-methylbicyclo[2.2.1]hept-2-ene, 5-tert-butoxycarbonylbicyclo[2.2.1]hept-2-ene, 5-cyclohexyloxycarbonylbicyclo[2.2.1]hept-2-ene, 5-phenoxycarbonylbicyclo[2.2.1]hept-2-ene, 5,6-bis(tert-butoxycarbonyl)bicyclo[2.2.1]hept-2-ene and 5,6-bis(cyclohexyloxycarbonyl)bicyclo[2.2.1]hept-2-ene; dicarbonylimide derivatives such as N-phenylmaleimide, N-cyclohexylmaleimide, N-benzylmaleimide, N-succinimidyl-3-maleimide benzoate, N-succinimidyl-4-maleimide butyrate, N-succinimidyl-6-maleimide caproate, N-succinimidyl-3-maleimide propionate and N-(9-acridinyl)maleimide; and styrene, α-methylstyrene, m-methylstyrene, p-methylstyrene, vinyltoluene, p-methoxystyrene, acrylonitrile, methacrylonitrile, vinyl chloride, vinylidene chloride, acrylamide, methacrylamide, vinyl acetate, 1,3-butadiene, isoprene and 2,3-dimethyl-1,3-butadiene.

Of these, styrene, vinyltoluene, N-phenylmaleimide, N-cyclohexylmaleimide, N-benzylmaleimide, bicyclo[2.2.1]hept-2-ene and the like are preferable from the viewpoint of copolymerization reactivity and heat resistance.

<Ratio of Each Structural Unit>

The copolymer (A) is, for example, a copolymer [K1] or a copolymer [K2].

The copolymer [K1] is a copolymer of the compound (Aa), the compound (Ab) and the compound (Ac).

The copolymer [K2] is a copolymer of the compound (Aa), the compound (Ab), the compound (Ac) and the compound (Ad).

In the copolymer [K1], the ratio of each structural unit to all structural units that form the copolymer [K1] is preferably 5 to 40 mol % for the structural unit derived from the compound (Aa), 5 to 90 mol % for the structural unit derived from the compound (Ab) and 5 to 40 mol % for the structural unit derived from the compound (Ac), more preferably 10 to 35 mol % for the structural unit derived from the compound (Aa), 10 to 80 mol % for the structural unit derived from the compound (Ab) and 10 to 35 mol % for the structural unit derived from the compound (Ac).

When the ratios of the structural units that form the copolymer [K1] are within the above-described ranges, a coating film prepared from a colored resin composition containing the copolymer tends to be excellent in solvent resistance.

The copolymer [K1] can be produced with reference to, for example, the methods disclosed in the document "Experimental Methods for Synthesis of Polymers" (Takayuki Otsu, published by Kagaku-Dojin Publishing Company, INC., Vol. 1, First Printing, published on Mar. 1, 1972) and the cited documents disclosed in the above-mentioned document.

Specifically, a method is mentioned in which predetermined amounts of the compound (Aa), the compound (Ab) and the compound (Ac), a polymerization initiator, a solvent and the like are put in a reaction vessel, and the reaction mixture is brought into a deoxygenated atmosphere by, for example, replacing oxygen by nitrogen, and heated and kept hot while being stirred. The polymerization initiator, the solvent and the like used here are not particularly limited, and those that are typically used in the art can be used. Examples of the polymerization initiator include azo compounds (2,2'-azobisisobutyronitrile, 2,2'-azobis(2,4-dimethylvaleronitrile) and the like) and organic peroxides (benzoyl peroxide and the like), the solvent may be one in which each monomer is soluble, and examples of the solvent include solvents which are used in colored resin compositions and which are described later.

The copolymer prepared by the above-described method may be used in the form of a solution after reaction itself, in the form of a solution obtained by concentration or dilution of the solution after reaction, or in the form of a solid (powder) extracted by a method such as reprecipitation. In particular, when a solvent to be used for the colored resin composition of the present invention is used, the solution after reaction can be used directly for production of the colored resin composition, so that it is possible to simplify the process for production of the colored resin composition.

In the copolymer [K2], the ratio of each structural unit to all structural units that form the copolymer [K2] is preferably 5 to 40 mol % for the structural unit derived from the compound (Aa), 5 to 90 mol % for the structural unit derived from the compound (Ab), 5 to 40 mol % for the structural unit derived from the compound (Ac) and 1 to 40 mol % for the structural unit derived from the compound (Ad), more preferably 10 to 35 mol % for the structural unit derived from the compound (Aa), 10 to 80 mol % for the structural unit derived from the compound (Ab), 10 to 35 mol % for the structural unit derived from the compound (Ac) and 5 to 35 mol % for the structural unit derived from the compound (Ad).

When the ratios of the structural units that form the copolymer [K2] are within the above-described ranges, a coating film prepared from a colored resin composition containing the copolymer tends to be excellent in solvent resistance. The resin [K2] can be produced by the same method as used for production of the resin [K1].

Examples of the copolymer [K1] include copolymers of p-vinylbenzoic acid, the compound represented by formula (Z-1) and a mixture containing the compound represented by formula (I-1) and the compound represented by formula (II-1) at a ratio of 50:50; and copolymers of p-vinylbenzoic acid, the compound represented by formula (Z-2) and a mixture containing the compound represented by formula (I-1) and the compound represented by formula (II-1) at a ratio of 50:50.

Examples of the copolymer [K2] include copolymers containing the structural units of the resin [K1] shown above, and the structural unit derived from the compound (Ad).

The weight average molecular weight (Mw) of the copolymer (A) in terms of polystyrene is preferably 3000 to 100000, more preferably 5000 to 50000, still more preferably 5000 to 20000, especially preferably 5000 to 10000. When the weight average molecular weight (Mw) of the copolymer (A) is within the above-described range, the resin composition tends to have good coating properties.

The degree of dispersion of the copolymer (A) [weight average molecular weight (Mw)/number average molecular weight (Mn)] is preferably 1.1 to 6.0, more preferably 1.2 to 4.0. When the degree of dispersion is within the above-described range, the resulting coating film tends to be excellent in solvent resistance.

The acid value of the copolymer (A) is preferably 1 mg-KOH/g or more and 180 mg-KOH/g or less, more preferably 5 mg-KOH/g or more and 150 mg-KOH/g or less, still more preferably 10 mg-KOH/g or more and 135 mg-KOH/g or less. Here, the acid value is a value measured as the amount (mg) of potassium hydroxide necessary for neutralizing 1 g of resin, and can be determined by performing titration with a potassium hydroxide aqueous solution. When the acid value of the copolymer (A) is within the above-described range, the resulting coating film tends to be excellent in adhesion with a substrate.

The total content percentage of the structural unit (Aa) and the structural unit (Ab) is preferably 40 to 90 mol % based on the total amount of structural units that form the copolymer (A).

[Colored Resin Composition]

The colored resin composition of the present invention contains the copolymer (A), a colorant (B) and a solvent (E), and may contain at least one selected from a polymerizable compound (C) and a polymerization initiator (D). The colored resin composition of the present invention may contain a polymerization initiation aid (D1) and a leveling agent (F) if necessary. The ingredients will be described in detail below. Herein, compounds shown as each ingredient can be used singly or in combinations of a plurality thereof unless otherwise specified.

<Copolymer (A)>

The copolymer (A) is as described above. The content percentage of the copolymer (A) is preferably 30 to 90 mass %, more preferably 35 to 80 mass %, still more preferably 40 to 70 mass %, based on the solid content of the colored resin composition of the present invention. When the content percentage of the copolymer (A) is within the above-described range, the resulting coating film tends to be excellent in heat resistance and excellent in adhesion with a substrate and chemical resistance. Here, the solid content of the colored resin composition refers to an amount obtained by subtracting the content of the solvent (E) from the total amount of the colored resin composition of the present invention.

<Colorant (B)>

The colorant (B) contains a dye. Preferably, the colorant (B) contains a first dye (B-1) as described in detail below. This is because when the colorant (B) contains the first dye (B-1), the solvent resistance of the coating film obtained from the colored resin composition tends to be deteriorated, and thus the effect of the present invention, which allows excellent solvent resistance to be obtained, becomes more remarkable. The colorant (B) may contain as a dye the first dye (B-1) together with a second dye (B-2) different from the first dye (B-1), or only the second dye (B-2).

(First Dye (B-1))

The first dye (B-1) is a squarylium dye. The squarylium dye can be used without being particularly limited as long as it is a compound represented by formula (III).

[Formula 12]

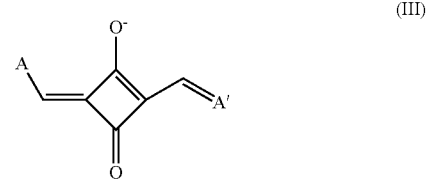

(III)

In formula (III), A and A' each independently represent an organic group containing an aromatic ring or a heterocyclic ring. The compounds represented by formula (III) include compounds having any possible resonance structures with respect to the structure represented by formula (III).

Examples of the squarylium dye represented by formula (III) include the compounds disclosed in Japanese Patent Laid-Open No. 2013-76926. Among the compounds represented by formula (III), compounds represented by formula (IV) (hereinafter, sometimes referred to as "compounds (IV)") are preferable as the squarylium dye.

[Formula 12]

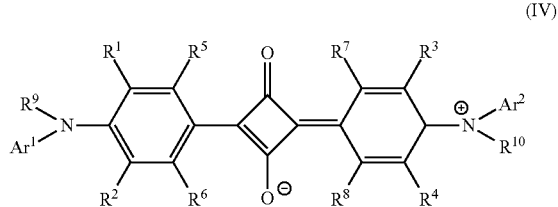

(IV)

In formula (IV), $R^1$ to $R^4$ each independently represent a hydrogen atom, a halogen atom, a hydroxy group, or a monovalent saturated hydrocarbon group having 1 to 20 carbon atoms. A hydrogen atom or a methyl group contained in the monovalent saturated hydrocarbon group is optionally replaced by a halogen atom, a hydroxy group or an alkylamino group having 1 to 8 carbon atoms, and an oxygen atom or a sulfur atom is optionally intercalated between carbon atoms that form the monovalent saturated hydrocarbon group.

$R^5$ to $R^8$ each independently represent a hydrogen atom or a hydroxy group.

$Ar^1$ and $Ar^2$ each independently represent a group of the following formula (i).

[Formula 14]

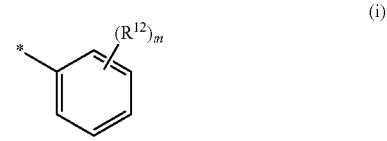

(i)

In formula (i), $R^{12}$ represents a monovalent saturated hydrocarbon group having 1 to 20 carbon atoms, or a monovalent unsaturated hydrocarbon group having 2 to 20 carbon atoms, and m represents an integer of 1 to 5. When m is 2 or more, a plurality of $R^{12}$ may be the same or different. * represents a point of attachment to a nitrogen atom.

$R^9$ to $R^{10}$ each independently represent a monovalent saturated hydrocarbon group having 1 to 20 carbon atoms, or a group represented by formula (i). A hydrogen atom or a methyl group contained in the monovalent saturated hydrocarbon group is optionally replaced by a halogen atom, a hydroxy group, or an amino group substituted with one or two alkyl groups having 1 to 8 carbon atoms, and an oxygen atom or a sulfur atom is optionally intercalated between carbon atoms that form the monovalent saturated hydrocarbon group.

Examples of the halogen atom in $R^1$ to $R^4$ in formula (II) include a fluorine atom, a chlorine atom, a bromine atom and an iodine atom.

Examples of the monovalent saturated hydrocarbon group having 1 to 20 carbon atoms in $R^1$ to $R^4$, $R^9$, $R^{10}$ and $R^{12}$ include linear alkyl groups having 1 to 20 carbon atoms, such as a methyl group, an ethyl group, a propyl group, a butyl group, a pentyl group, a hexyl group, a heptyl group, an octyl group, a nonyl group, a decyl group, a dodecyl group, a hexadecyl group and an icosyl group; branched alkyl groups having 3 to 20 carbon atoms, such as an isopropyl group, an isobutyl group, a sec-butyl group, a tert-butyl group, an isopentyl group, a neopentyl group and a 2-ethylhexyl group; and cycloaliphatic saturated hydrocarbon groups having 3 to 20 carbon atoms, such as a cyclopropyl group, a cyclopentyl group, a cyclohexyl group, a cyclopentyl group, a cyclooctyl group and a tricyclodecyl group.

Examples of the group in which a hydrogen atom or a methyl group contained in the saturated hydrocarbon group is replaced by a halogen atom, a hydroxy group or an amino group substituted with one or two alkyl groups having 1 to 8 carbon atoms include groups of the following formulas. Here, examples of the amino group substituted with one or two alkyl groups having 1 to 8 carbon atoms include a methylamino group, an ethylamino group, a n-propylamino group, a n-butylamino group, a n-pentylamino group, a dimethylamino group, a diethylamino group, a dibutylamino group and a methylethylamino group. In the following formulas, * represents a point of attachment.

[Formula 15]

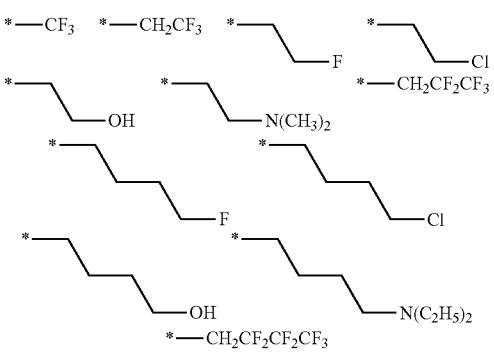
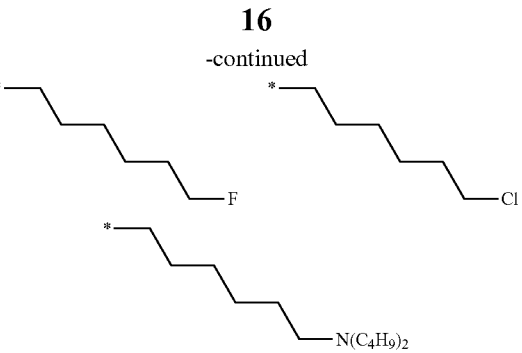

Examples of the group in which an oxygen atom or a sulfur atom is intercalated between carbon atoms that form the saturated hydrocarbon group include groups of the following formulas. In the following formulas, * represents a point of attachment.

[Formula 16]

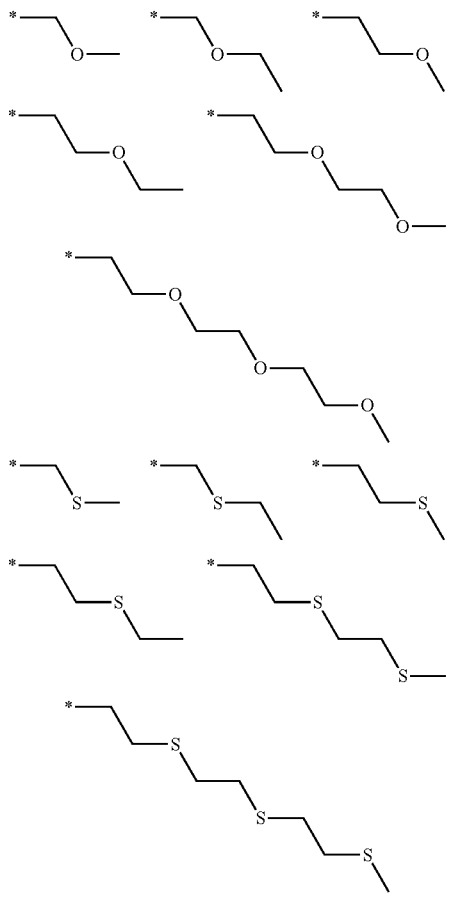

Examples of the monovalent unsaturated hydrocarbon group having 2 to 20 carbon atoms in $R^{12}$ include a vinyl group, a propenyl group, a butenyl group, a pentenyl group, a hexenyl group, a heptenyl group, an octenyl group, a nonenyl group and a decenyl group.

Examples of the group represented by formula (i) include the following groups. * represents a point of attachment to a nitrogen atom.

[Formula 17]

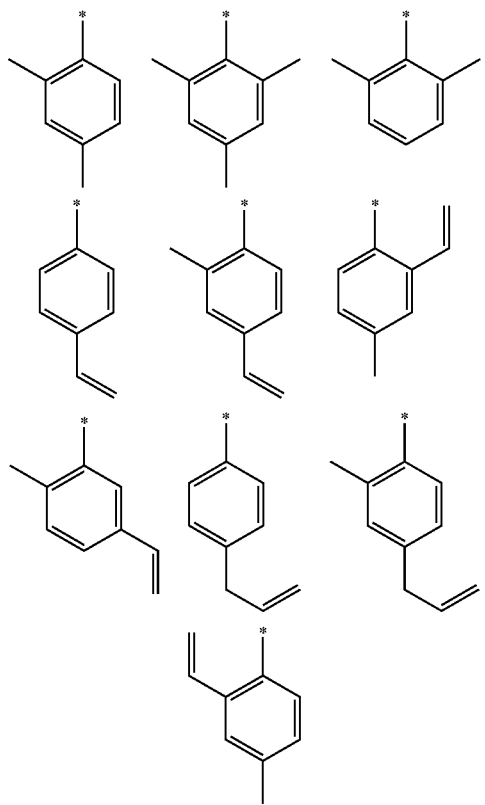

R¹ to R⁴ are each preferably a hydrogen atom, a hydroxy group or a methyl group, more preferably a hydrogen atom.

$R^9$ and $R^{10}$ are each preferably an octyl group, a nonyl group, a decyl group, a dodecyl group, a 2-ethylhexyl group or a group represented by formula (i), more preferably a 2-ethylhexyl group.

$R^{12}$ is preferably an alkyl group having 1 to 4 carbon atoms, more preferably a methyl group or an ethyl group.

wherein $X^1$ is a group of the formula:

[Formula 18]

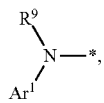

and $X^2$ is a group of the formula:

[Formula 19]

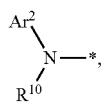

examples of the groups of $X^1$ and $X^2$ include groups represented by formulas (A2-1) to (A2-7). * represents a point of attachment to a carbon atom.

[Formula 20]

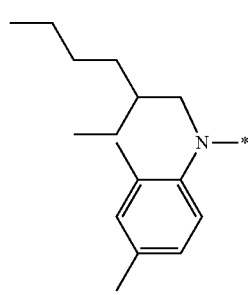

(A2-1)

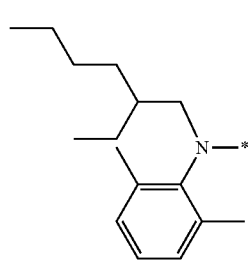

(A2-2)

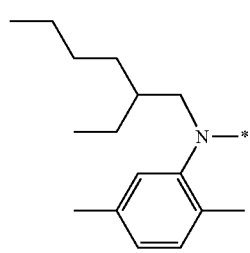

(A2-3)

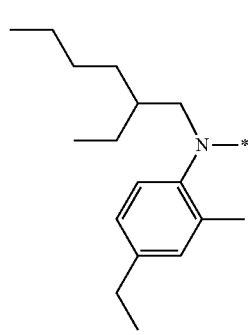

(A2-4)

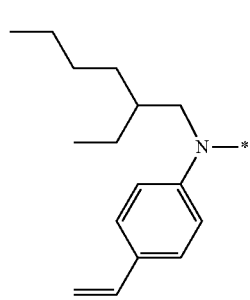

(A2-5)

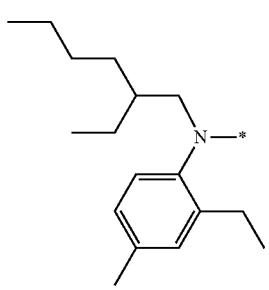
(A2-6)

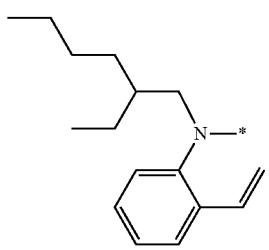
(A2-7)

Examples of the compound represented by formula (IV) include compound (AII-1) to compound (AII-21) shown in Table 1.

[Formula 21]

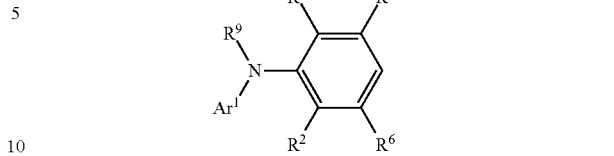
(IV-1)

In formula (IV-1), $R^1$, $R^2$, $R^5$, $R^6$, $R^9$ and $Ar^1$ each have the same meaning as described above.

The amount of squaric acid used is preferably 0.5 mol or more and 0.8 mol or less, more preferable 0.55 mol or more and 0.6 mol or less, per mol of the compound represented by formula (IV-1).

The reaction temperature is preferably 30° C. to 180° C., more preferably 80° C. to 140° C. The reaction time is preferably 1 hour to 12 hours, more preferably 3 hours to 8 hours.

Preferably, the reaction is carried out in an organic solvent from the viewpoint of yield. Examples of the organic solvent include hydrocarbon solvents such as toluene and xylene; halogenated hydrocarbon solvents such as chlorobenzene, dichlorobenzene and chloroform; alcohol solvents such as methanol, ethanol, isopropanol and butanol; nitrohydrocarbon solvents such as nitrobenzene; ketone solvents such as methyl isobutyl ketone; and amide solvents such as 1-methyl-2-pyrrolidone, and a mixture of any of these solvents may be used. In particular, mixed solvents of butanol and toluene are preferable. The amount of the

TABLE 1

| Compound | $R^1$ | $R^2$ | $R^3$ | $R^4$ | $R^5$ | $R^6$ | $R^7$ | $R^8$ | $X^1$ | $X^2$ |
|---|---|---|---|---|---|---|---|---|---|---|
| AII-1 | H | H | H | H | H | H | H | H | A2-1 | A2-1 |
| AII-2 | H | H | H | H | H | H | H | H | A2-2 | A2-2 |
| AII-3 | H | H | H | H | H | H | H | H | A2-3 | A2-3 |
| AII-4 | H | H | H | H | H | H | H | H | A2-4 | A2-4 |
| AII-5 | H | H | H | H | H | H | H | H | A2-5 | A2-5 |
| AII-6 | H | H | H | H | H | H | H | H | A2-6 | A2-6 |
| AII-7 | H | H | H | H | H | H | H | H | A2-7 | A2-7 |
| AII-8 | H | H | H | H | OH | OH | H | H | A2-1 | A2-1 |
| AII-9 | H | H | H | H | OH | OH | H | H | A2-2 | A2-2 |
| AII-10 | H | H | H | H | OH | OH | H | H | A2-3 | A2-3 |
| AII-11 | H | H | H | H | OH | OH | H | H | A2-4 | A2-4 |
| AII-12 | H | H | H | H | OH | OH | H | H | A2-5 | A2-5 |
| AII-13 | H | H | H | H | OH | OH | H | H | A2-6 | A2-6 |
| AII-14 | H | H | H | H | OH | OH | H | H | A2-7 | A2-7 |
| AII-15 | H | H | H | H | OH | OH | OH | OH | A2-1 | A2-1 |
| AII-16 | H | H | H | H | OH | OH | OH | OH | A2-2 | A2-2 |
| AII-17 | H | H | H | H | OH | OH | OH | OH | A2-3 | A2-3 |
| AII-18 | H | H | H | H | OH | OH | OH | OH | A2-4 | A2-4 |
| AII-19 | H | H | H | H | OH | OH | OH | OH | A2-5 | A2-5 |
| AII-20 | H | H | H | H | OH | OH | OH | OH | A2-6 | A2-6 |
| AII-21 | H | H | H | H | OH | OH | OH | OH | A2-7 | A2-7 |

From the viewpoint of raw material availability, the compounds (AII-8) to (AII-14) are more preferable, and the compound (AII-8) is particularly preferable.

The compound (IV) of the present invention can be produced by, for example, the method disclosed in Japanese Patent Laid-Open No. 2002-363434, i.e. a method in which a compound represented by formula (IV-1) is reacted with squaric acid (3,4-dihydroxy-3-cyclobutene-1,2-dione).

organic solvent used is preferably 30 parts by mass or more and 200 parts by mass or less, more preferably 50 parts by mass or more and 150 parts by mass or less per mol of the compound represented by formula (IV-1).

The method for obtaining a compound (II) as a target compound from the reaction mixture is not particularly limited, and various known methods can be employed. For example, a method may be mentioned in which crystals precipitated after cooling are taken by filtration. Preferably, the crystals taken by filtration are washed with water etc., and then dried. If necessary, the crystals may be further purified by a known method such as recrystallization.

The compound represented by formula (IV-1) can be produced by reacting a compound represented by formula (IV-2) with a compound represented by formula (IV-3) to produce a compound represented by formula (IV-4), and then reacting the compound represented by formula (IV-4) with a compound represented by formula (IV-5).

[Formula 22]

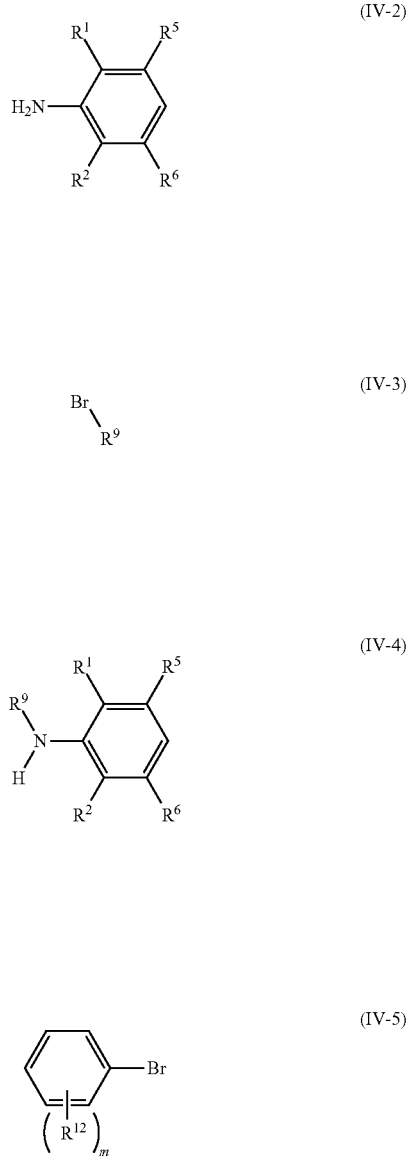

In formula (IV-2) to formula (IV-5), $R^1$, $R^2$, $R^5$, $R^6$, $R^9$, $R^{12}$ and m each have the same meaning as described above.

Examples of methods for producing the compound represented by formula (IV-4) from the compound represented by formula (IV-2) and the compound represented by formula (IV-3) include various known methods, for example the method disclosed in Eur. J. org. Chem. 2012, 3105-3111.

Examples of methods for producing the compound represented by formula (IV-1) from the compound represented by formula (IV-4) and the compound represented by formula (IV-5) include various known methods, for example the method disclosed in J. Polymer Science Science Part A: Polymer Chemistry 2012, 50, 3788-3796.

When the colorant (B) contains the first dye (B-1), the content of the first dye (B-1) is preferably 1 to 100 mass %, more preferably 3 to 99.9 mass %, based on the total amount of the colorant.

(Second Dye)

The second dye (B-2) is not limited as long as it is a dye other than a squarylium dye, and examples of the second dye include dyes such as oil-soluble dyes, acidic dyes, amine salts of acidic dyes and sulfonamide derivatives of acidic dyes, for example compounds classified as dyes in Color Index International (Journal of The Society of Dyers and Colourists), and known dyes disclosed in Dyeing Note (Shikisensha Co., Ltd.). Examples of the second dye classified in terms of chemical structures include coumarin dyes, gold-containing azo dyes, pyridine azo dyes, barbituric azo dyes, quinophthalone dyes, methine dyes, cyanine dyes, anthraquinone dyes, triphenylmethane dyes, xanthene dyes and phthalocyanine dyes. These dyes may be used singly or in combinations of two or more thereof.

Specific examples include C.I. solvent dyes such as C.I. Solvent Yellow 4 (hereinafter, "C.I. Solvent Yellow" is omitted, and only the numbers are described), 14, 15, 23, 24, 38, 62, 63, 68, 82, 94, 98, 99 and 162, and C.I. Solvent Oranges 2, 7, 11, 15, 26 and 56; C.I. acid dyes such as C.I. Acid Yellows 1, 3, 7, 9, 11, 17, 23, 25, 29, 34, 36, 38, 40, 42, 54, 65, 72, 73, 76, 79, 98, 99, 111, 112, 113, 114, 116, 119, 123, 128, 134, 135, 138, 139, 140, 144, 150, 155, 157, 160, 161, 163, 168, 169, 172, 177, 178, 179, 184, 190, 193, 196, 197, 199, 202, 203, 204, 205, 207, 212, 214, 220, 221, 228, 230, 232, 235, 238, 240, 242, 243 and 251, and C.I. Acid Oranges 6, 7, 8, 10, 12, 26, 50, 51, 52, 56, 62, 63, 64, 74, 75, 94, 95, 107, 108, 169 and 173;

C.I. direct dyes such as C.I. Direct Yellows 2, 33, 34, 35, 38, 39, 43, 47, 50, 54, 58, 68, 69, 70, 71, 86, 93, 94, 95, 98, 102, 108, 109, 129, 136, 138 and 141, and C.I. Direct Oranges 34, 39, 41, 46, 50, 52, 56, 57, 61, 64, 65, 68, 70, 96, 97, 106 and 107; and C.I. mordant dyes such as C.I. Mordant Yellows 5, 8, 10, 16, 20, 26, 30, 31, 33, 42, 43, 45, 56, 61, 62 and 65, and C.I. Mordant Oranges 3, 4, 5, 8, 12, 13, 14, 20, 21, 23, 24, 28, 29, 32, 34, 35, 36, 37, 42, 43, 47 and 48.

The second dye (B-2) is preferably a yellow dye such as a coumarin dye, a gold-containing azo dye, a pyridine azo dye, a barbituric azo dye, a quinophthalone dye, a methine dye or a cyanine dye. It is preferable that the colorant contain a yellow dye because the lightness of the resulting color filter can be enhanced.

Examples of the yellow dye include compounds shown below.

[Formula 23]

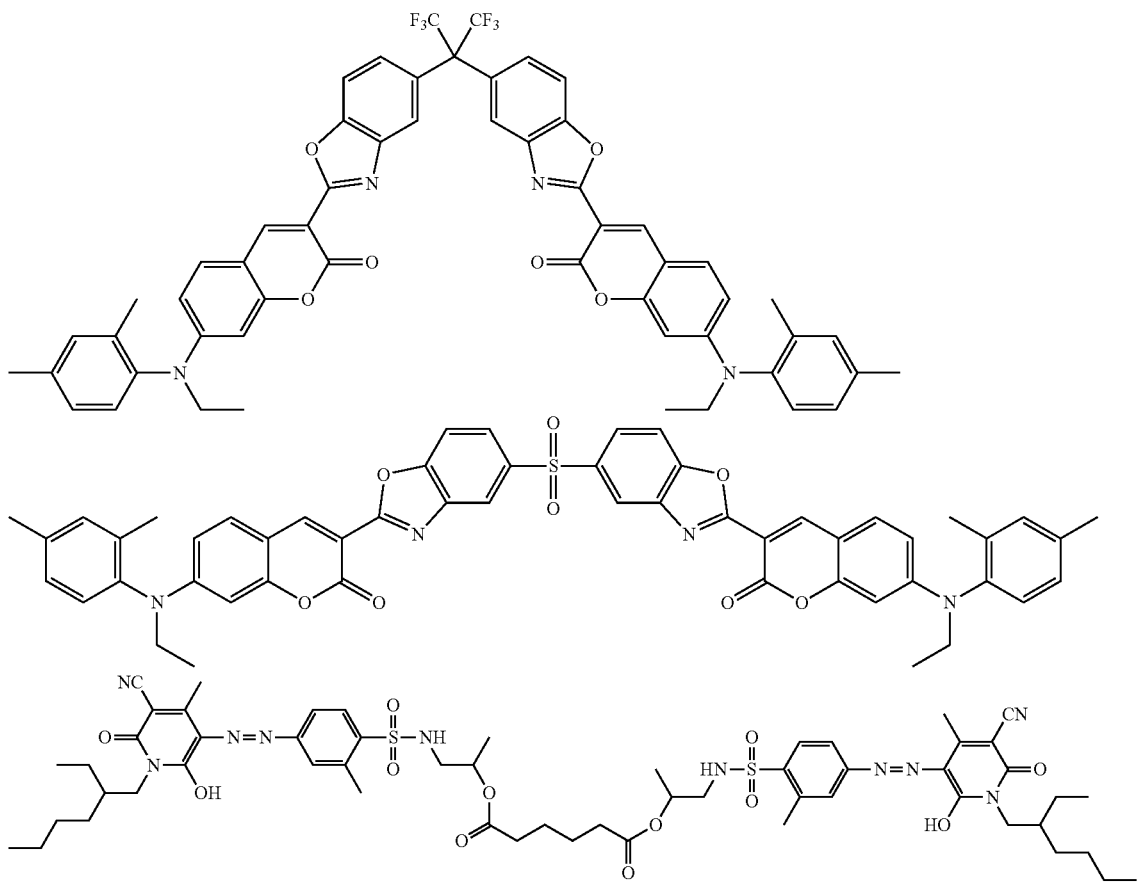

When the colorant (B) of the colored resin composition contains the second dye (B-2), the content of the second dye (B-2) is 3 to 99 mass %, preferably 4 to 98 mass %, based on the total amount of the colorant. The content of the second dye (B-2) is preferably within the above-described range because the color value is easily adjusted. It is preferable that the colorant contain a yellow dye as the second dye (B-2) and the content of the yellow dye be within the above-described range because the lightness of the resulting color filter can be enhanced.

(Other Colorant Ingredients)

The colorant (B) of the colored resin composition may contain, in addition to the first dye (B-1) and the second dye (B-2), a pigment (P) for color matching, i.e. for adjustment of spectral characteristics.

The pigment (P) is not particularly limited, and a known pigment can be used. Examples thereof include pigments classified as pigments in Color Index International (Journal of The Society of Dyers and Colourists).

Examples thereof include yellow pigments such as C.I. Pigment Yellows 1, 3, 12, 13, 14, 15, 16, 17, 20, 24, 31, 53, 83, 86, 93, 94, 109, 110, 117, 125, 128, 137, 138, 139, 147, 148, 150, 153, 154, 166, 173, 194 and 214; orange-colored pigments such as C.I. Pigment Oranges 13, 31, 36, 38, 40, 42, 43, 51, 55, 59, 61, 64, 65, 71 and 73; and green pigments such as C.I. Pigment Greens 7, 36 and 58.

As the pigment (P), yellow pigments such as C.I. Pigment Yellows 1, 3, 12, 13, 14, 15, 16, 17, 20, 24, 31, 53, 83, 86, 93, 94, 109, 110, 117, 125, 128, 137, 138, 139, 147, 148, 150, 153, 154, 166, 173, 194 and 214; and green pigments such as C.I. Pigment Greens 7, 36 and 58 are preferable, and C.I. Pigment Yellows 150 and 185 and C.I. Pigment Green 58 are more preferable.

The content percentage of the colorant (B) is preferably 0.1 to 60 mass %, more preferably 1 to 55 mass %, still more preferably 2 to 50 mass %, based on the total amount of solid contents of the colored resin composition. When the content percentage of the colorant (B) is within the above-described range, the color concentration of the resulting color filter is sufficient, and the composition can be made to contain a required amount of the copolymer (A), so that it is possible to form a color filter having sufficient mechanical strength. The "total amount of solid contents" herein is an amount obtained by subtracting the content of the solvent from the total amount of the colored resin composition. The total amount of solid contents and the content of each ingredient based on the total amount of solid contents can be measured by known analytical means such as, for example, liquid chromatography or gas chromatography.

<Polymerizable Compound (C)>

The polymerizable compound (C) is a compound which can be polymerized with the aid of an active radical and/or an acid generated from the polymerization initiator (D), and examples thereof include compounds having a polymerizable ethylenically unsaturated bond, with (meth)acrylic acid ester compounds being preferable.

In particular, the polymerizable compound (C) is preferably a polymerizable compound having three or more ethylenically unsaturated bonds. Examples of the polymerizable compound include trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa(meth)acrylate, tripentaerythritol hepta(meth)acrylate, tetrapentaerythritol deca(meth)acrylate, tetrapentaerythritol nona(meth)acrylate, tris(2-(meth)acryloyloxyethyl)isocyanurate, ethylene glycol-modified pentaerythritol tetra(meth)acrylate, ethylene glycol-modified dipentaerythritol hexa(meth)acrylate, propylene glycol-modified pentaerythritol tetra(meth)acrylate, propylene glycol-modified dipentaerythritol hexa(meth)acrylate, caprolactone-modified pentaerythritol tetra(meth)acrylate, caprolactone-modified dipentaerythritol hexa(meth)acrylate.

In particular, dipentaerythritol penta(meth)acrylate and dipentaerythritol hexa(meth)acrylate are preferable.

The weight average molecular weight of the polymerizable compound (C) is preferably 150 or more and 2,900 or less, more preferably 250 or more and 1,500 or less.

The polymerizable compound (C) may be contained or not contained in the colored resin composition according to the present invention. When the polymerizable compound (C) is present, the content thereof is 50 parts by mass or less, preferably 30 parts by mass or less, more preferably 10 parts by mass or less, per 100 parts by mass of the copolymer (A). When the content of the polymerizable compound (C) is within the above-described range, it is possible to obtain a colored resin composition capable of forming a coating film having further excellent solvent resistance.

<Polymerization Initiator (D)>

The polymerization initiator (D) is not particularly limited as long as it is a compound capable of generating an active radical, an acid or the like under the action of light or heat, and a known polymerization initiator can be used. Examples of the polymerization initiator which generates an active radical include O-acyloxime compounds, alkylphenone compounds, triazine compounds, acylphosphine oxide compounds and biimidazole compounds.

Examples of the O-acyloxime compounds include N-benzoyloxy-1-(4-phenylsulfanylphenyl)butan-1-one-2-imine, N-benzoyloxy-1-(4-phenylsulfanylphenyl)octan-1-one-2-imine, N-benzoyloxy-1-(4-phenylsulfanylphenyl)-3-cyclopentylpropan-1-one-2-imine, N-acetoxy-1-[9-ethyl-6-(2-methylbenzoyl)-9H-carbazol-3-yl]ethane-1-imine, N-acetoxy-1-[9-ethyl-6-{2-methyl-4-(3,3-dimethyl-2,4-dioxacyclopentanylmethyloxy)benzoyl}-9H-carbazol-3-yl]ethane-1-imine, N-acetoxy-1-[9-ethyl-6-(2-methylbenzoyl)-9H-carbazol-3-yl]-3-cyclopentylpropane-1-imine and N-benzoyloxy-1-[9-ethyl-6-(2-methylbenzoyl)-9H-carbazol-3-yl]-3-cyclopentylpropan-1-one-2-imine. A commercially available product such as IRGACURE® OXE01 and OXE02 (each manufactured by BASF SE) and N-1919 (manufactured by ADEKA Corporation) may be used. In particular, the O-acyloxime compound is preferably at least one selected from the group consisting of N-benzoyloxy-1-(4-phenylsulfanylphenyl)butan-1-one-2-imine, N-benzoyloxy-1-(4-phenylsulfanylphenyl)octan-1-one-2-imine and N-benzoyloxy-1-(4-phenylsulfanylphenyl)-3-cyclopentylpropan-1-one-2-imine, more preferably N-benzoyloxy-1-(4-phenylsulfanylphenyl)octan-1-one-2-imine. These O-acyloxime compounds tend to allow the resulting color filter to have high lightness.

Examples of the alkylphenone compounds include 2-methyl-2-morpholino-1-(4-methylsulfanylphenyl)propan-1-one, 2-dimethylamino-1-(4-morpholinophenyl)-2-benzylbutan-1-one, 2-(dimethylamino)-2-[(4-methylphenyl)methyl]-1-[4-(4-morpholinyl)phenyl]butan-1-one, 2-hydroxy-2-methyl-1-phenylpropan-1-one, 2-hydroxy-2-methyl-1-[4-(2-hydroxyethoxy)phenyl]propan-1-one, 1-hydroxycyclohexyl phenyl ketone, oligomers of 2-hydroxy-2-methyl-1-(4-isopropenylphenyl)propan-1-one, α,α-diethoxyacetophenone and benzyl dimethyl ketal. Commercially available products such as IRGACURE® 369, 907 and 379 (each manufactured by BASF SE) may be used.

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine and 2,4-bis(trichloromethyl)-6-[2-(3,4-dimethoxyphenyl)ethenyl]-1,3,5-triazine.

Examples of the acylphosphine oxide compounds include 2,4,6-trimethylbenzoyldiphenylphosphine oxide. Commercially available products such as IRGACURE® 819 (manufactured by BASF SE) may be used.

Examples of the biimidazole compounds include 2,2'-bis(2-chlorophenyl)-4,4',5,5'-tetraphenylbiimidazole, 2,2'-bis(2,3-dichlorophenyl)-4,4',5,5'-tetraphenylbiimidazole (see, for example, Japanese Patent Laid-Open No. 6-75372 and Japanese Patent Laid-Open No. 6-75373), 2,2'-bis(2-chlorophenyl)-4,4',5,5'-tetraphenylbiimidazole, 2,2'-bis(2-chlorophenyl)-4,4',5,5'-tetra(alkoxyphenyl)biimidazole, 2,2'-bis(2-chlorophenyl)-4,4',5,5'-tetra(dialkoxyphenyl)biimidazole, 2,2'-bis(2-chlorophenyl)-4,4',5,5'-tetra(trialkoxyphenyl)biimidazole (see, for example, Japanese Patent Publication No. 48-38403 and Japanese Patent Laid-Open No. 62-174204), and biimidazole compounds in which the phenyl group at the 4,4',5,5'-position is replaced by a carboalkoxy group (see, for example, Japanese Patent Laid-Open No. 7-10913).

Further, examples of the polymerization initiator (D) include benzoin compounds such as benzoin, benzoin methyl ether, benzoin ethyl ether, benzoin isopropyl ether and benzoin isobutyl ether; benzophenone compounds such as benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone, 2,4,6-trimethylbenzophenone; quinone compounds such as 9,10-phenanthrenquinone, 2-ethylanthraquinone and camphorquinone; and 10-butyl-2-chloroacridone, benzyl, methyl phenylglyoxylate and titanocene compounds.

Examples of the polymerization initiator which generates an acid include onium salts such as 4-hydroxyphenyldimethylsulfonium p-toluenesulfonate, 4-hydroxyphenyldimethylsulfonium hexafluoroantimonate, 4-acetoxyphenyldimethylsulfonium p-toluenesulfonate, 4-acetoxyphenylmethyl-benzylsulfonium hexafluoroantimonate, triphenylsulfonium p-toluenesulfonate, triphenylsulfonium hexafluoroantimonate, diphenyliodonium p-toluenesulfonate and diphenyliodonium hexafluoroantimonate; nitrobenzyltosylates; and benzointosylates.

The polymerization initiator (D) may be contained or not contained in the colored resin composition according to the present invention. When the polymerization initiator (D) is present, the content thereof is 50 parts by mass or less, preferably 30 parts by mass or less, more preferably 10 parts by mass or less, per 100 parts by mass of the copolymer (A). When the content of the polymerization initiator (D) is within the above-described range, it is possible to obtain a colored resin composition capable of forming a coating film having further excellent solvent resistance.

The total content of the polymerizable compound (C) and the polymerization initiator (D) in the colored resin composition according to the present invention is 50 parts by mass or less, preferably 30 parts by mass or less, more preferably 10 parts by mass or less, per 100 parts by mass of the content of the copolymer (A). When the total content of the polymerizable compound (C) and the polymerization initiator (D) is within the above-described range, it is possible to obtain a colored resin composition having further excellent storage stability. The colored resin composition according to the present invention is not required to contain both the polymerizable compound (C) and the polymerization initiator (D).

<Solvent (E)>

The solvent (E) is not particularly limited, and a solvent which is typically used in the art can be used. Examples of the solvent include ester solvents (solvents which contain —COO— and do not contain —O— in the molecule), ether solvents (solvents which contain —O— and do not contain —COO— in the molecule), ether ester solvents (solvents which contain —COO— and —O— in the molecule), ketone solvents (solvents which contain —CO— and do not contain —COO— in the molecule), alcohol solvents (solvents which contain OH and do not contain —O—, —CO— and —COO— in the molecule), aromatic hydrocarbon solvents, amide solvents and dimethyl sulfoxide.

Examples of the ester solvent include methyl lactate, ethyl lactate, butyl lactate, methyl 2-hydroxyisobutanoate, ethyl acetate, n-butyl acetate, isobutyl acetate, pentyl formate, isopentyl acetate, butyl propionate, isopropyl butyrate, ethyl butyrate, butyl butyrate, methyl pyruvate, ethyl pyruvate, propyl pyruvate, methyl acetoacetate, ethyl acetoacetate, cyclohexanol acetate and γ-butyrolactone.

Examples of the ether solvent include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monopropyl ether, propylene glycol monobutyl ether, 3-methoxy-1-butanol, 3-methoxy-3-methylbutanol, tetrahydrofuran, tetrahydropyran, 1,4-dioxane, diethylene glycol dimethyl ether, diethylene glycol diethyl ether, diethylene glycol methyl ethyl ether, diethylene glycol dipropyl ether, diethylene glycol dibutyl ether, anisole, phenetole and methyl anisole.

Examples of the ether ester solvent include methyl methoxyacetate, ethyl methoxyacetate, butyl methoxyacetate, methyl ethoxyacetate, ethyl ethoxyacetate, methyl 3-methoxypripionate, ethyl 3-methoxypripionate, methyl 3-ethoxypropionate, ethyl 3-ethoxypropionate, methyl 2-methoxypropionate, ethyl 2-methoxypropionate, propyl 2-methoxypropionate, methyl 2-ethoxypropionate, ethyl 2-ethoxypropionate, methyl 2-methoxy-2-methylpropionate, ethyl 2-ethoxy-2-methylpropionate, 3-methoxybutyl acetate, 3-methyl-3-methoxybutyl acetate, propylene glycol monomethyl ether acetate, propylene glycol monoethyl ether acetate, propylene glycol monopropyl ether acetate, ethylene glycol monomethyl ether acetate, ethylene glycol monoethyl ether acetate, diethylene glycol monoethyl ether acetate and diethylene glycol monobutyl ether acetate.

Examples of the ketone solvent include 4-hydroxy-4-methyl-2-pentanone, acetone, 2-butanone, 2-heptanone, 3-heptanone, 4-heptanone, 4-methyl-2-pentanone, cyclopentanone, cyclohexanone and isophorone.

Examples of the alcohol solvent include methanol, ethanol, propanol, butanol, hexanol, cyclohexanol, ethylene glycol, propylene glycol and glycerin.

Examples of the aromatic hydrocarbon solvent include benzene, toluene, xylene and mesitylene.

Examples of the amide solvent include N,N-dimethylformamide, N,N-dimethylacetamide and N-methylpyrrolidone.

Of the above-described solvents, organic solvents having a boiling point of 120° C. or more and 210° C. or less at 1 atm are preferable from the viewpoint of coating properties and drying properties. The solvent is preferably propylene glycol monomethyl ether acetate, ethyl lactate, propylene glycol monomethyl ether, ethyl 3-ethoxypropionate, ethylene glycol monomethyl ether, diethylene glycol monomethyl ether, diethylene glycol monoethyl ether, 4-hydroxy-4-methyl-2-pentanone or N,N-dimethylformamide, more preferably propylene glycol monomethyl ether acetate, propylene glycol monomethyl ether, N,N-dimethylformamide, N-methylpyrrolidone or ethyl 3-ethocypropionate.

The content of the solvent (E) is preferably 70 to 95 mass %, more preferably 75 to 92 mass %, based on the total amount of the colored resin composition of the present invention. In other words, the total amount of solid contents of the colored resin composition is preferably 5 to 30 mass %, more preferably 8 to 25 mass %. When the content of the solvent (E) is within the above-described range, flatness during coating tends to be improved, and display characteristics tend to be improved because there is no deficiency in color concentration when a color filter is formed.

The content of the solvent (E) is preferably 70 to 95 mass %, more preferably 75 to 92 mass %, based on the total amount of the colored resin composition of the present invention. In other words, the total amount of solid contents of the colored resin composition is preferably 5 to 30 mass %, more preferably 8 to 25 mass %. When the content of the solvent (E) is within the above-described range, flatness during coating tends to be improved.

<Polymerization Initiation Aid (D1)>

The polymerization initiation aid (D1) is a compound to be used for accelerating polymerization of a polymerizable compound, the polymerization of which has been started by the polymerization initiator (D), or a sensitizer. The polymerization initiation aid (D1) is typically used in combination with the polymerization initiator (D).

Examples of the polymerization initiation aid (D1) include amine compounds, alkoxyanthracene compounds, thioxanthone compounds and carboxylic acid compounds.

Examples of the amine compound include alkanolamines such as triethanolamine, methyldiethanolamine and triisopropanolamine; aminobenzoic acid esters such as methyl 4-dimethylaminobenzoate, ethyl 4-dimethylaminobenzoate, isoamyl 4-dimethylaminobenzoate, 2-dimethylaminoethyl benzoate and 2-ethylhexyl 4-dimethylaminobenzoate; and alkylaminobenzophenones such as N,N-dimethyl-para-toluidine, 4,4'-bis(dimethylamino)benzophenone (commonly called Michler's ketone), 4,4'-bis(diethylamino)benzophenone and 4,4'-bis(ethylmethylamino)benzophenone, and in particular, alkylaminobenzophenones are preferable, with 4,4'-bis(diethylamino)benzophenone being preferable. A commercially available product such as EAB-F (manufactured by Hodogaya Chemical Co., Ltd.) may be used.

Examples of the alkoxyanthracene compound include 9,10-dimethoxyanthracene, 2-ethyl-9,10-dimethoxyanthracene, 9,10-diethoxyanthracene, 2-ethyl-9,10-diethoxyanthracene, 9,10-dibutoxyanthracene and 2-ethyl-9,10-dibutoxyanthracene.

Examples of the thioxanthone compound include 2-isopropylthioxanthone, 4-isopropylthioxanthone, 2,4-diethylthioxanthone, 2,4-dichlorothioxanthone and 1-chloro-4-propoxythioxanthone.

Examples of the carboxylic acid compound include phenylsulfanylacetic acid, methylphenylsulfanylacetic acid, ethylphenylsulfanylacetic acid, methylethylphenylsulfanylacetic acid, dimethylphenylsulfanylacetic acid, methoxyphenylsulfanylacetic acid, dimethoxyphenylsulfanylacetica acid, chlorophenylsulfanylacetic acid, dichlorophenylsulfanylacetic acid, N-phenylglycine, phenoxyacetic acid, naphthylthioacetic acid, N-naphthylglycine and naphthoxyacetic acid.

When the polymerization initiation aid (D1) is used, the content thereof is 100 parts by mass or less per 100 parts by mass of the content of the polymerization initiator (D).

<Leveling Agent (F)>

Examples of the leveling agent (F) include silicone-based surfactants, fluorine-based surfactants, and silicone-based surfactants having fluorine atoms. These surfactants may have polymerizable groups on the side chain.

Examples of the silicone-based surfactant include surfactants having a siloxane bond in the molecule. Specific examples thereof include Toray Silicones DC3PA, SH7PA, DC11PA, SH21PA, SH28PA, SH29PA, SH30PA and SH8400 (trade name) (manufactured by Dow Corning Toray Co., Ltd.), KP321, KP322, KP323, KP324, KP326, KP340 and KP341 (manufactured by Shin-Etsu Chemical Co., Ltd.), and TSF400, TSF401, TSF410, TSF4300, TSF4440, TSF4445, TSF-4446, TSF4452 and TSF4460 (manufactured by Momentive Performance Materials Japan LLC).

Examples of the fluorine-based surfactant include surfactants having a fluorocarbon chain in the molecule. Specific examples thereof include FLUORAD® FC430 and FC431 (manufactured by Sumitomo 3M Ltd.), MEGAFAC® F142D, F171, F172, F173, F177, F183, F554, R30 and RS-718-K (manufactured by DIC Corporation), FTOP® EF301, EF303, EF351 and EF352 (manufactured by Mitsubishi Materials Electronic Chemicals Co., Ltd.), SURFLON® S381, 5382, SC101 and SC105 (manufactured by AGC Inc.) and E5844 (manufactured by Daikin Fine Chemical Laboratory Co., Ltd.).

Examples of the silicone-based surfactant having fluorine atoms include surfactants having a siloxane bond and a fluorocarbon chain in the molecule. Specific examples thereof include MEGAFAC® R08, BL20, F475, F477 and F443 (manufactured by DIC Corporation).

The content of the leveling agent (F) is preferably 0.001 parts by mass or more and 0.2 parts by mass or less, preferably 0.002 parts by mass or more and 0.1 parts by mass or less, more preferably 0.005 parts by mass or more and 0.05 parts by mass or less, per 100 parts by mass of the content of the copolymer (A). When the content of the leveling agent (F) is within the above-described range, the flatness of the color filter can be improved.

<Other Colored Resin Composition Ingredients>

If necessary, the colored resin composition of the present invention may contain additives known in the art, such as a filler, other polymer compounds, an adhesion promoting agent, an antioxidant, a light stabilizer and a chain transfer agent.

<Method for Producing Colored Resin Composition>

The colored resin composition of the present invention can be prepared by, for example, mixing the copolymer (A), the colorant (B) and the solvent (E) as well as the polymerizable compound (C), the polymerization initiator (D), the leveling agent (F), the polymerization initiation aid (D1) and other ingredients to be used if necessary.

When the colored resin composition contains the pigment (P), it is preferable that the pigment (P) be mixed with part or all of the solvent (E), and then dispersed using a bead mill or the like until the average particle size of the pigment is about 0.2 μm or less. Here, part or all of the pigment dispersant and the copolymer (A) may be blended if necessary.

By mixing the thus-obtained pigment dispersion with the residual ingredients so as to obtain a predetermined concentration, an intended colored resin composition can be prepared.

The dye may be dissolved beforehand in part or all of the solvent (E) to prepare a solution. Preferably, the solution is filtered with a filter having a pore size of about 0.01 to 1 μm.

Preferably, the colored resin composition after the mixing is filtered with a filter having a pore size of about 0.1 to 10 μm.

<Method for Producing Color Filter>

Examples of methods for producing a color filter from the colored resin composition of the present invention include a method in which the colored resin composition is applied onto a substrate, and dried under heating (pre-baked) and/or dried under reduced pressure to remove volatile ingredients such as a solvent, and thus a smooth colored composition layer is formed, followed by performing post-baking. The colored coating film which is a cured film formed in this way may be the color filter of the present invention.

As the substrate, a glass plate made of quarts glass, borosilicate glass, alumina-silicate glass, soda-lime glass having a silica-coated surface, or the like, a resin plate made of polycarbonate, polymethyl methacrylate, polyethylene terephthalate or the like, a silicon plate, or a plate obtained by forming an aluminum, silver or silver-copper-palladium alloy thin film, or the like on any of the aforementioned substrates is used. On such a substrate, another color filter layer, a resin layer, a transistor, a circuit and the like may be formed.

Examples of coating methods include a spin coating, a slit coating method, and a slit-and-spin coating method.

The temperature at which drying is performed under heating is preferably 30 to 120° C., more preferably 50 to 110° C. The heating time is preferably 10 seconds to 60 minutes, more preferably 30 seconds to 30 minutes.

When the composition is dried under reduced pressure, it is preferable to perform the drying at a temperature of 20 to 25° C. under a pressure of 50 to 150 Pa.

The thickness of the colored resin composition is not particularly limited, and may be appropriately selected according to the thickness of an intended color filter.

Preferably, the resulting colored resin composition film is post-baked. The post-baking temperature is preferably 150 to 250° C., more preferably 160 to 235° C. The post-baking time is preferably 1 to 120 minutes, more preferably 10 to 60 minutes.

The thickness of the resulting color filter is not particularly limited, and can be appropriately adjusted according to a purpose, a use and the like. For example, the thickness is 0.1 to 30 μm, preferably 0.1 to 20 μm, more preferably 0.5 to 6 μm.

The thus-obtained cured coating film can be patterned by, for example, an etching method.

The colored resin composition of the present invention can be used to produce a colored pattern by a photolithography method, an inkjet method, a printing method or the like. In particular, a photolithography method is preferable when the colored resin composition contains the polymerizable compound (C) and the polymerization initiator (D). The photolithography method is a method in which the colored resin composition is applied to a substrate, and dried to form a colored composition layer, and the colored composition layer is exposed through a photomask to perform development. The coating and the drying can be performed under the above-described conditions.

The colored composition layer is exposed through a photomask for forming an intended colored pattern. The pattern on the photomask is not particularly limited, and a pattern suitable for an intended use.

The light source to be used for the exposure is preferably a light source which generates light having a wavelength of 250 to 450 nm. For example, light having a wavelength of less than 350 nm may be cut using a filter which cuts light having a wavelength in this range, or light having wavelengths of about 436 nm, about 408 nm and about 365 nm may be selectively extracted using a bandpass filter which extracts light having wavelengths in these ranges. Specific examples of the light source include mercury lamps, light emitting diodes, metal halide lamps and halogen lamps.

Use of exposure devices such as mask aligners and steppers is preferable because the entire exposure surface can be uniformly irradiated with parallel light beams, or the photomask can be accurately aligned with the substrate provided with a colored composition layer.

By bringing the exposed colored composition layer into contact with a developer to perform development, a colored pattern is formed on the substrate. Through the development, unexposed areas of the colored composition layer are dissolved in the developer and thus removed. For example, the developer is preferably an aqueous solution of an alkaline compound such as potassium hydroxide, sodium hydrogen carbonate, sodium carbonate or tetramethylammonium hydroxide. The concentration of the alkaline compound in the aqueous solution is preferably 0.01 to 10 mass %, more preferably 0.03 to 5 mass %. Further, the developer may contain a surfactant.

The development method may be any of a paddle method, a dipping method, a spray method and the like. Further, the substrate may be tilted at any angle.

Preferably, washing is performed with water after the development.

Preferably, the resulting colored pattern is post-baked. The post-baking temperature and time may be the same as the above-described temperature and time.

The colored resin composition of the present invention is capable of forming a coating film having excellent solvent resistance, and is therefore useful for preparation of a color filter. The color filter is useful as a color filter to be used for display devices (for example, liquid crystal display devices, organic EL devices and electronic papers) and solid-state image sensors.

EXAMPLES

Hereinafter, the present invention will be described in more detail by way of Examples, which should not be construed as limiting the present invention. In Examples, the term "%" and the term "parts" for expressing the content or the used amount are by mass unless otherwise specified.

In Synthesis Examples below, the structures of compounds were identified by NMR (JNM-EX-270 (manufactured by JEOL Ltd.)).

Synthesis Example 1: Synthesis of Copolymer a1

The inside of a flask equipped with a reflux condenser, a dropping funnel and a stirrer was brought into a nitrogen atmosphere by feeding an appropriate amount of nitrogen into the flask, and 290 parts of propylene glycol monomethyl ether acetate was put in the flask, and heated to 85° C. with stirring. Subsequently, a mixed solution of 94 parts of a mixture of 3,4-epoxytricyclo[5.2.1.0$^{2.6}$]decan-8-yl acrylate and 3,4-epoxytricyclo[5.2.1.0$^{2.6}$]decan-9-yl acrylate (content ratio: 1:1), 61 parts of 4-vinylbenzoic acid, 157 parts of phenyl methacrylate and 250 parts of propylene glycol monomethyl ether acetate was added dropwise over 4 hours.

On the other hand, a mixed solution obtained by dissolving 9 parts of 2,2-azobis(2,4-dimethylvaleronitrile) in 110 parts of propylene glycol monomethyl ether acetate was added dropwise over 5 hours. After completion of the dropwise addition, the inside of the flask was held at 85° C. for 3 hours, and then cooled to room temperature to give a copolymer (copolymer a1) solution having a B-type viscosity of 70 mPas (23° C.) and a solid content of 28.2 wt %. The generated copolymer a1 had a weight average molecular weight (Mw) of 17000 and a molecular weight distribution (Mw/Mn) of 2.23. The copolymer a1 has the structural units shown below.

[Formula 24]

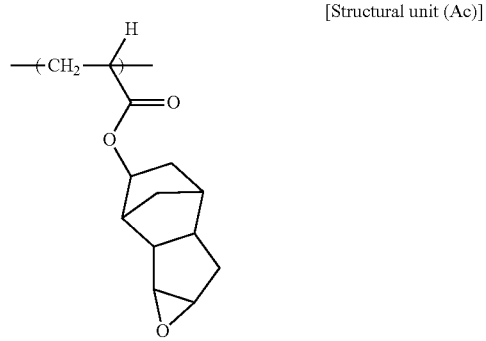

[Structural unit (Ac)]

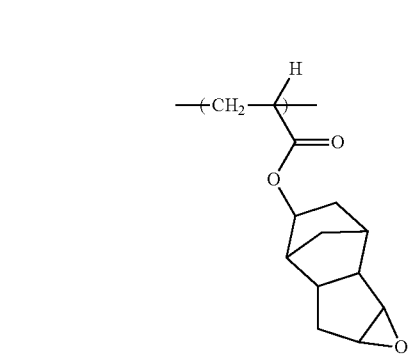

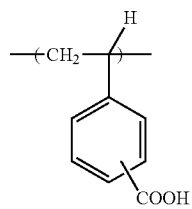

[Structural unit (Aa)]

[Structural unit (Ab)]

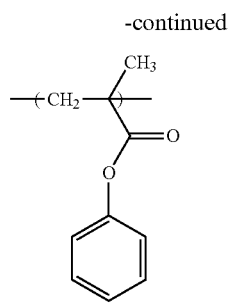

The weight average molecular weight (Mw) and the number average molecular weight (Mn) of the copolymer a1 in terms of polystyrene were measured by a GPC method under the following conditions.
Apparatus: HLC-8120GPC (manufactured by TOSOH Corporation)
Column: TSK-GELG2000HXL
Column temperature: 40° C.
Solvent: THF
Flow rate: 1.0 mL/min
Test liquid solid content concentration: 0.001 to 0.01 mass %
Injection amount: 50 μL
Detector: RI
Standard substances for calibration: TSK STANDARD POLYSTYRENE F-40, F-4, F-288, A-2500 and A-500 (manufactured by TOSOH Corporation)
The ratio between the thus-obtained weight average molecular weight and number average molecular weight (Mw/Mn) in terms of polystyrene was defined as a molecular weight distribution. The same applies to the copolymers a2, a3 and a4 below.

Synthesis Example 2: Synthesis of Copolymer a2

The inside of a flask equipped with a reflux condenser, a dropping funnel and a stirrer was brought into a nitrogen atmosphere by feeding an appropriate amount of nitrogen into the flask, and 290 parts of propylene glycol monomethyl ether acetate was put in the flask, and heated to 85° C. with stirring. Subsequently, a mixed solution of 60 parts of a mixture of 3,4-epoxytricyclo[5.2.1.0$^{2.6}$]decan-8-yl acrylate and 3,4-epoxytricyclo[5.2.1.0$^{2.6}$]decan-9-yl acrylate (content ratio: 1:1), 40 parts of 4-vinylbenzoic acid, 205 parts of phenyl methacrylate and 250 parts of propylene glycol monomethyl ether acetate was added dropwise over 4 hours.
On the other hand, a mixed solution obtained by dissolving 9 parts of 2,2-azobis(2,4-dimethylvaleronitrile) in 110 parts of propylene glycol monomethyl ether acetate was added dropwise over 5 hours. After completion of the dropwise addition, the inside of the flask was held at 85° C. for 3 hours, and then cooled to room temperature to give a copolymer (copolymer a2) solution having a B-type viscosity of 70 mPas (23° C.) and a solid content of 28.2 wt %. The generated copolymer a2 had a weight average molecular weight (Mw) of 17000 and a molecular weight distribution (Mw/Mn) of 2.23. The copolymer a2 has the same structural units as those of the above-described copolymer a1.

Synthesis Example 3: Synthesis of Copolymer a3

The inside of a flask equipped with a reflux condenser, a dropping funnel and a stirrer was brought into a nitrogen atmosphere by feeding an appropriate amount of nitrogen into the flask, and 290 parts of propylene glycol monomethyl ether acetate was put in the flask, and heated to 85° C. with stirring. Subsequently, a mixed solution of 115 parts of a mixture of 3,4-epoxytricyclo[5.2.1.0$^{2.6}$]decan-8-yl acrylate and 3,4-epoxytricyclo[5.2.1.0$^{2.6}$]decan-9-yl acrylate (content ratio: 1:1), 78 parts of 4-vinylbenzoic acid, 113 parts of phenyl methacrylate and 250 parts of propylene glycol monomethyl ether acetate was added dropwise over 4 hours.
On the other hand, a mixed solution obtained by dissolving 9 parts of 2,2-azobis(2,4-dimethylvaleronitrile) in 110 parts of propylene glycol monomethyl ether acetate was added dropwise over 5 hours. After completion of the dropwise addition, the inside of the flask was held at 85° C. for 3 hours, and then cooled to room temperature to give a copolymer (copolymer a3) solution having a B-type viscosity of 70 mPas (23° C.) and a solid content of 24.5 wt %. The generated copolymer a3 had a weight average molecular weight (Mw) of 16000 and a molecular weight distribution (Mw/Mn) of 2.40. The copolymer a3 has the same structural units as those of the above-described copolymer a1.

Synthesis Example 4: Synthesis of Copolymer a4

The inside of a flask equipped with a reflux condenser, a dropping funnel and a stirrer was brought into a nitrogen atmosphere by feeding an appropriate amount of nitrogen into the flask, and 283 parts of propylene glycol monomethyl ether acetate was put in the flask, and heated to 85° C. with stirring. Subsequently, a mixed solution of 93 parts of a mixture of 3,4-epoxytricyclo[5.2.1.0$^{2.6}$]decan-8-yl acrylate and 3,4-epoxytricyclo[5.2.1.0$^{2.6}$]decan-9-yl acrylate (content ratio: 1:1), 31 parts of acrylic acid, 83 parts of phenyl methacrylate and 240 parts of propylene glycol monomethyl ether acetate was added dropwise over 4 hours.
On the other hand, a mixed solution obtained by dissolving 9 parts of 2,2-azobis(2,4-dimethylvaleronitrile) in 110 parts of propylene glycol monomethyl ether acetate was added dropwise over 5 hours. After completion of the dropwise addition, the inside of the flask was held at 85° C. for 3 hours, and then cooled to room temperature to give a copolymer (copolymer a4) solution having a B-type viscosity of 167 mPas (23° C.) and a solid content of 28.2 wt %. The generated copolymer a4 had a weight average molecular weight (Mw) of 17000 and a molecular weight distribution (Mw/Mn) of 2.41. The copolymer a4 has the structural units shown below.

[Formula 25]

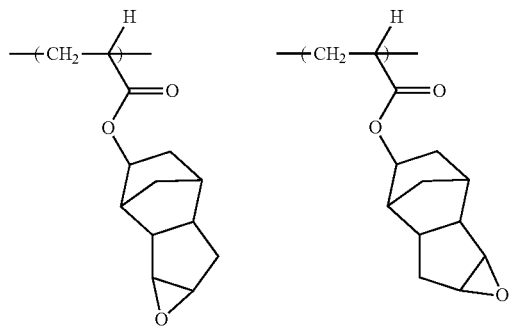

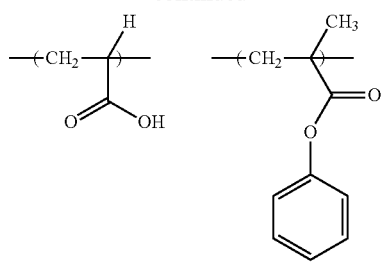

Synthesis Example 5: Synthesis of Squarylium Dye b1

10.0 parts of 2,4-dimethylaniline (manufactured by Tokyo Chemical Industry Co., Ltd.), 17.0 parts of 2-ethylhexane bromide (manufactured by Tokyo Chemical Industry Co., Ltd.) and 44.0 parts of tetrabutylammonium bromide (manufactured by Wako Kagaku Kogyo K.K.) were mixed. The resulting mixture was stirred at 90° C. for 8 hours. After completion of the reaction, 50 parts of 10% sodium bicarbonate water was added, 100 parts of ethyl acetate was then added, and the aqueous layer was discarded. The operation of washing with water and 10% chloric acid was repeated twice, and the solvent was then distilled away. The obtained oil was dried under reduced pressure at 60° C. for 24 hours to give 9.3 parts of a compound represented by the following formula (d-1).

[Formula 26]

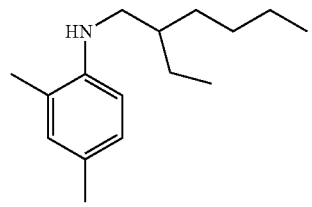

(d-1)

$^1$H-NMR of the compound represented by formula (d-1) (270 MHz, δ value (ppm, referenced to TMS), DMSO-d6) 0.85 (m, 6H), 1.23-1.42 (br, 8H), 1.59 (br, 1H), 2.04 (s, 3H), 2.12 (s, 3H), 2.91 (d, 2H), 4.37 (br, 1H), 6.38 (d, 1H), 6.75 (s, 1H), 6.77 (d, 1H)

3.0 parts of the thus-obtained compound (d-1), 2.2 parts of 3-bromophenol (manufactured by Tokyo Chemical Industry Co., Ltd.), 0.015 parts of palladium acetate, 3.2 parts of (tert-butoxy)sodium (manufactured by Tokyo Chemical Industry Co., Ltd.), 0.055 parts of tri-tert-butylphosphine and 25.6 parts of toluene were mixed, and the resulting mixture was stirred at 100° C. for 15 hours. 30 parts of ethyl acetate and 100 parts of water were added to the resulting mixture, and the aqueous layer was discarded. The operation of washing with water was repeated twice, and the solvent was then distilled away. The residue was purified by silica gel chromatography (chloroform/hexane=1/1), and the obtained oil was dried under reduced pressure at 60° C. for 24 hours to give 1.9 parts of a compound represented by the following formula (d-2).

[Formula 27]

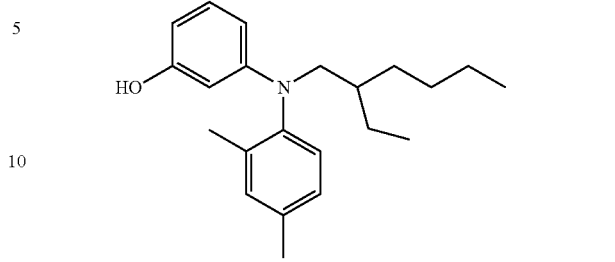

(d-2)

$^1$H-NMR of the compound represented by formula (d-2) (270 MHz, δ value (ppm, referenced to TMS), DMSO-d6) 0.85 (m, 6H), 1.23-1.42 (br, 8H), 1.55 (br, 1H), 1.94 (s, 3H), 2.27 (s, 3H), 2.90 (d, 2H), 6.37 (d, 1H), 6.75 (s, 1H), 6.76 (d, 1H), 6.92-7.14 (m, 4H), 8.93 (s, 1H)

4.4 parts of the thus-obtained compound represented by formula (d-2), which is an intermediate, 0.8 parts of 3,4-dihydroxy-3-cyclobuten-1,2-dione (manufactured by Tokyo Chemical Industry Co., Ltd.), 90.0 parts of 1-butanol and 60.0 parts of toluene were mixed. The resulting mixture was stirred at 125° C. for 3 hours while water generated was removed using a Dean-Stark tube. After completion of the reaction, the solvent was distilled away, 15 parts of acetic acid was added, the resulting mixture was then added dropwise to 100 parts of a 18% salt solution, and the precipitated solid was taken by filtration. The solid taken by filtration was washed with hexane. The obtained solid was dried under reduced pressure at 60° C. for 24 hours to give 4.9 parts of a compound (squarylium dye b1) represented by formula (AII-8).

[Formula 28]

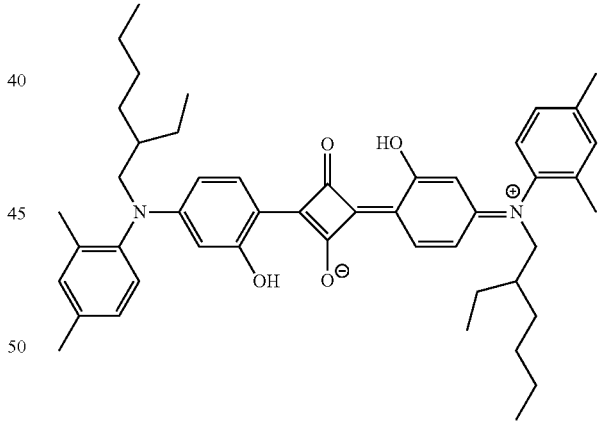

(AII-8)

$^1$H-NMR of the compound represented by formula (AII-8) (270 MHz, δ value (ppm, referenced to TMS), DMSO-d6) 0.87 (m, 12H), 1.21-1.57 (m, 16H), 1.72 (br, 2H), 2.05 (s, 6H), 2.36 (s, 6H), 3.37 (br, 2H), 3.78 (br, 2H), 6.00 (br, 4H), 6.97-7.12 (m, 6H), 7.77-7.95 (m, 2H), 11.35 (s, 1H), 12.06 (s, 1H)

Synthesis Example 6: Synthesis of Yellow Dye b2

A compound (yellow dye b2) represented by the following formula was produced by a method for producing a compound represented by formula (Ad2-14) as disclosed in Japanese Patent Laid-Open No. 2016-11419. The compound represented by the following formula is the same compound as the compound represented by formula (Ad2-14) in Japanese Patent Laid-Open No. 2016-11419.

[Formula 29]

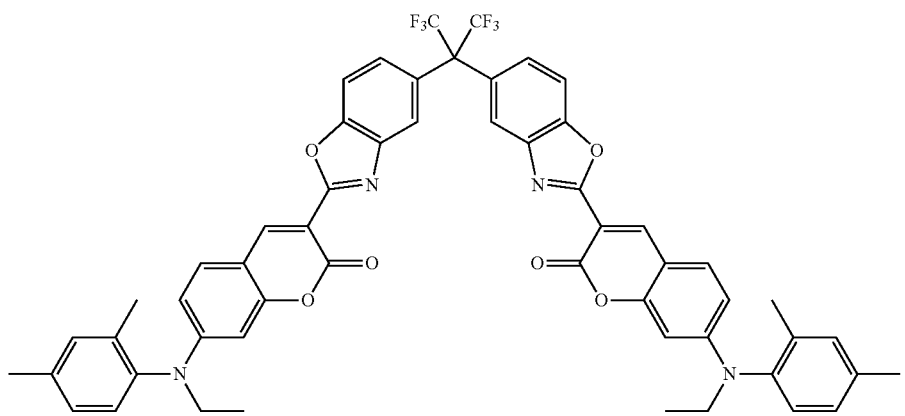

[Preparation of Colored Resin Composition]

The colored resin compositions of Examples 1 to 5 and Comparative Example 1 were obtained by mixing the ingredients in accordance with the compositions shown in Table 2 below. The compositions shown in Table 2 each represent an amount in terms of solid content except for the solvent (E). The unit of the numerical value for each ingredient in Table 2 is the number of parts by mass.

The ingredients in Table 2 are shown below.

Copolymer a1: compound synthesized in Synthesis Example 1
Copolymer a2: compound synthesized in Synthesis Example 2
Copolymer a3: compound synthesized in Synthesis Example 3
Copolymer a4: compound synthesized in Synthesis Example 4
Squarylium dye b1: compound synthesized in Synthesis Example 5
Yellow dye b2: compound synthesized in Synthesis Example 6
Solvent e1: propylene glycol monomethyl ether acetate
Leveling agent f1: MEGAFAC® F554 (manufactured by DIC Corporation)

[Formation of Coating Film]

The colored resin composition prepared in each of Examples 1 to 5 and Comparative Example 1 was applied onto a glass substrate of 5 cm square (EAGLE XG; manufactured by Corning Inc.) by a spin coating method so as to have a thickness of 0.5 μm after post-baking, and then pre-baked on a hot plate at 70° C. for 1 hour to give a colored coating film. Thereafter, the film was post-baked on a hot plate at 240° C. for 9 minutes to give a colored coating film (hereinafter, referred to as a "colored coating film after post-baking").

<Evaluation of Solvent Resistance>

5 ml of a solvent (propylene glycol monomethyl ether acetate (PGMEA)) was added dropwise onto the colored coating film after post-baking, left standing for 1 minute, and then dried to evaporate the solvent. The transmittance $T_\lambda$ (%) of the colored coating film before dropwise addition of the solvent and the transmittance $T'_\lambda$ (%) of the colored coating film after drying after dropwise addition of the solvent for light having a wavelength λ (nm) were measured. The transmittances were measured using a spectrophotometer (Ultraviolet-Visible-Near Infrared Spectrophotometer V-770 manufactured by JASCO Corporation). The measurement was performed by scanning the wavelength λ (nm) every 1 nm over the range of 401 to 700 nm, i.e. at 300 wavelengths of 401 nm, 402 nm, 403 nm, ... 700 nm, and the average amount of change in transmittance, ΔT, was calculated from the following expression using the transmittances $T_\lambda$ and the transmittances $T'_\lambda$ at 300 wavelengths. Table 2 shows the calculation results.

$$\Delta T = \frac{\sum_{\lambda=401}^{700} (T'_\lambda - T_\lambda)}{300}$$ [Expression 1]

TABLE 2

| | | Example 1 | Comparative Example 1 | Example 2 | Example 3 | Example 4 | Example 5 |
|---|---|---|---|---|---|---|---|
| Copolymer (A) | Copolymer a1 (parts by mass) | 100 | — | 100 | 100 | — | — |
| | Copolymer a2 (parts by mass) | — | — | — | — | 100 | — |
| | Copolymer a3 (parts by mass) | — | — | — | — | — | 100 |
| | Copolymer a4 (parts by mass) | — | 100 | — | — | — | — |
| Colorant (B) | Squarylium dye b1 (parts by mass) | 13 | 13 | 10 | 7.5 | 7.5 | 7.5 |
| | Yellow dye b2 (parts by mass) | 30 | 30 | 23 | 17.5 | 17.5 | 17.5 |

TABLE 2-continued

|  |  | Example 1 | Comparative Example 1 | Example 2 | Example 3 | Example 4 | Example 5 |
|---|---|---|---|---|---|---|---|
| Leveling agent (F) | Leveling agent f1 (parts by mass) | 0.1 | 0.1 | 0.1 | 0.1 | 0.1 | 0.1 |
| Solvent (E) | Solvent e1 (parts by mass) | 1287 | 1287 | 1200 | 1125 | 1125 | 1125 |
| Solid content concentration (%) |  | 10 | 10 | 10 | 10 | 10 | 10 |
| Average amount of change in transmittance ΔT (%) |  | 1.56 | 5.59 | 1.03 | 0.94 | 2.46 | 1.25 |

As shown in Table 2, the coating film of each of Examples 1 to 5 using the colored resin composition containing the copolymer of the present invention had a smaller average amount of change in transmittance after dropwise addition of the solvent as compared to the coating film of Comparative Example 1.

The invention claimed is:

1. A colored resin composition comprising (a) a copolymer and (b) a first dye that is a squarylium dye, wherein the copolymer comprises a structural unit (Aa) derived from an aromatic carboxylic acid having an ethylenically unsaturated bond, a structural unit (Ab) represented by formula (Z), and a structural unit (Ac) derived from a compound having a structure in which an unsaturated cycloaliphatic hydrocarbon is epoxidized

[Formula 1]

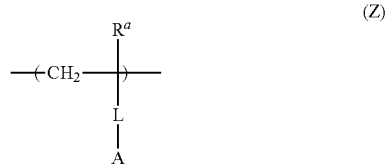

(Z)

wherein L represents —COO—, A represents a phenyl group optionally having a substituent other than a carboxy group or a naphthyl group optionally having a substituent other than a carboxy group, $R^a$ represents a hydrogen atom, or an alkyl group having 1 to 4 carbon atoms, and a hydrogen atom contained in the alkyl group is optionally replaced by a hydroxy group.

2. The colored resin composition according to claim 1, wherein the total content percentage of the structural unit (Aa) and the structural unit (Ab) in the copolymer is 40 mol % or more and 90 mol % or less based on the total amount of all structural units.

3. A cured film formed of the colored resin composition according to claim 2.

4. A color filter formed of the colored resin composition according to claim 2.

5. A cured film formed of the colored resin composition according to claim 1.

6. A color filter formed of the colored resin composition according to claim 1.

* * * * *